US012579087B2

(12) United States Patent
Shah et al.

(10) Patent No.: US 12,579,087 B2
(45) Date of Patent: Mar. 17, 2026

(54) IN-BAND INTERRUPT SIGNAL FOR A COMMUNICATION INTERFACE

(71) Applicant: QUALCOMM Incorporated, San Diego, CA (US)

(72) Inventors: Parth Saurabhkumar Shah, Bangalore (IN); Amit Gil, Zichron Yaakov (IL)

(73) Assignee: Qualcomm Incorporated, San Diego, CA (US)

( * ) Notice: Subject to any disclaimer, the term of this patent is extended or adjusted under 35 U.S.C. 154(b) by 52 days.

(21) Appl. No.: 18/410,833

(22) Filed: Jan. 11, 2024

(65) Prior Publication Data

US 2025/0231896 A1 Jul. 17, 2025

(51) Int. Cl.
*G06F 13/28* (2006.01)
*G06F 13/24* (2006.01)

(52) U.S. Cl.
CPC .......... *G06F 13/24* (2013.01); *G06F 2213/24* (2013.01)

(58) Field of Classification Search
CPC .............................. G06F 13/24; G06F 2213/24
See application file for complete search history.

(56) References Cited

U.S. PATENT DOCUMENTS

| | | | | |
|---|---|---|---|---|
| 6,665,306 | B1 * | 12/2003 | Thakur | ............... H04L 63/0428 |
| | | | | 710/110 |
| 10,963,419 | B1 * | 3/2021 | Chin | ........................ G06F 13/24 |
| 11,886,369 | B1 * | 1/2024 | Shah | ................... G06F 13/4282 |
| 2006/0143348 | A1 * | 6/2006 | Wilson | ................ G06F 13/4291 |
| | | | | 710/110 |
| 2017/0153997 | A1 | 6/2017 | Chiu et al. | |
| 2018/0046595 | A1 * | 2/2018 | Pitigoi-Aron | ....... G06F 13/4022 |
| 2022/0300197 | A1 * | 9/2022 | Sethuraman | .......... G06F 3/0673 |
| 2024/0184735 | A1 * | 6/2024 | Kim | .................. H04L 12/40104 |

OTHER PUBLICATIONS

Intel: "Enhanced Serial Peripheral Interface (eSPI) Interface Base Specification (for Client and Server Platforms)", Jan. 31, 2016, pp. 1-130, XP093238664, figures 1,4,7,11,58, tables 2,22, pp. 25-26, p. 58, pp. 112-113.
International Search Report and Written Opinion—PCT/US2024/053631—ISA/EPO—Jan. 31, 2025.

* cited by examiner

*Primary Examiner* — Henry Tsai
*Assistant Examiner* — Kim T Huynh
(74) *Attorney, Agent, or Firm* — Harrity & Harrity, LLP

(57) ABSTRACT

In some aspects, a system may transmit, via a main device of the system, a first value of a chip select signal indicating chip select de-assertion. The system may transmit, via a target device of the system, an interrupt signal while the chip select line indicates the first value. The system may transmit, via the main device and via the chip select line, a second value of the chip select signal indicating chip select assertion. The system may perform, via at least one of the one or more data lines, one or more data operations based on the target device transmitting the interrupt signal. Numerous other aspects are described.

30 Claims, 9 Drawing Sheets

200

200

230
Obtain data

Main Device
110

Controller(s)
140

CS

CLK

IO

IRQ

235
CS signal indicating
CS is asserted

245
Toggle CLK signal

250
Data transfer

CS

CLK

IO

IRQ

240
Release data
line(s) (IO line(s))

Target Device
120

Controller(s)
150

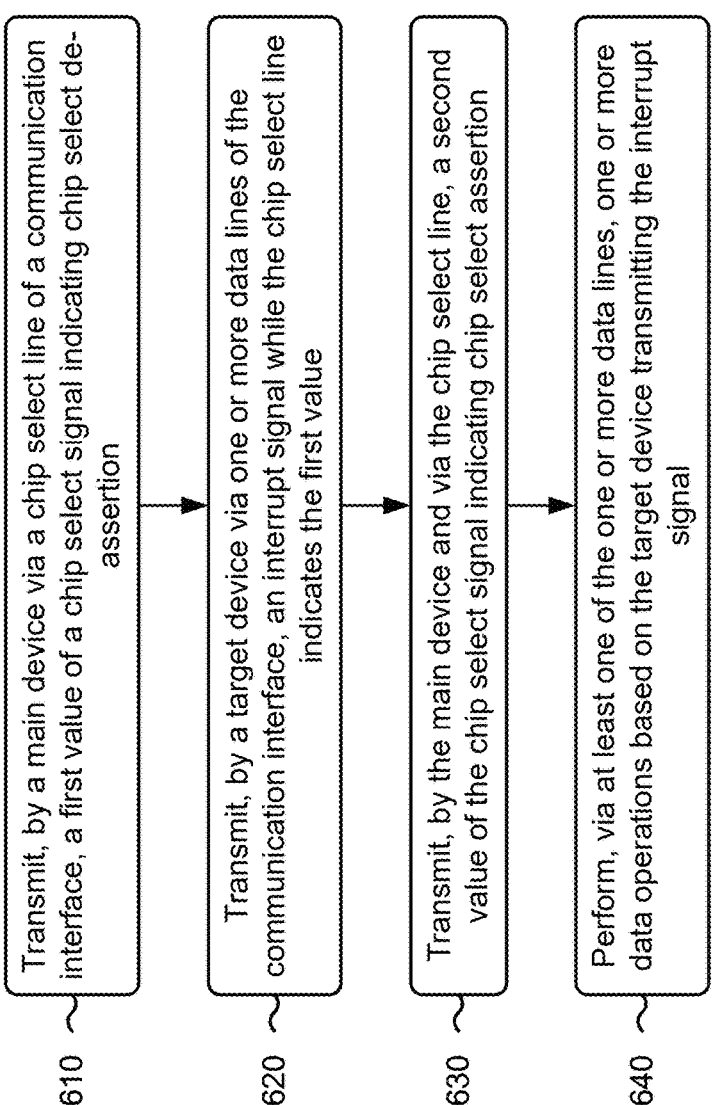

600

610 — Transmit, by a main device via a chip select line of a communication interface, a first value of a chip select signal indicating chip select de-assertion 620 — Transmit, by a target device via one or more data lines of the communication interface, an interrupt signal while the chip select line indicates the first value 630 — Transmit, by the main device and via the chip select line, a second value of the chip select signal indicating chip select assertion 640 — Perform, via at least one of the one or more data lines, one or more data operations based on the target device transmitting the interrupt signal

FIG. 6

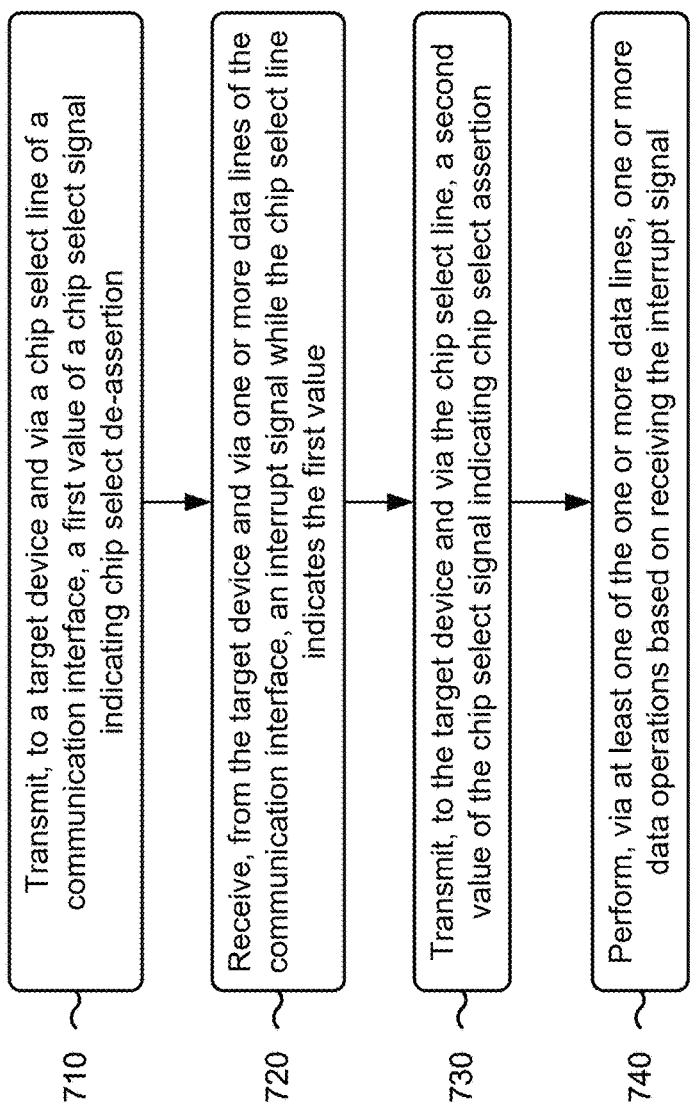

710   Transmit, to a target device and via a chip select line of a communication interface, a first value of a chip select signal indicating chip select de-assertion 720   Receive, from the target device and via one or more data lines of the communication interface, an interrupt signal while the chip select line indicates the first value 730   Transmit, to the target device and via the chip select line, a second value of the chip select signal indicating chip select assertion 740   Perform, via at least one of the one or more data lines, one or more data operations based on receiving the interrupt signal

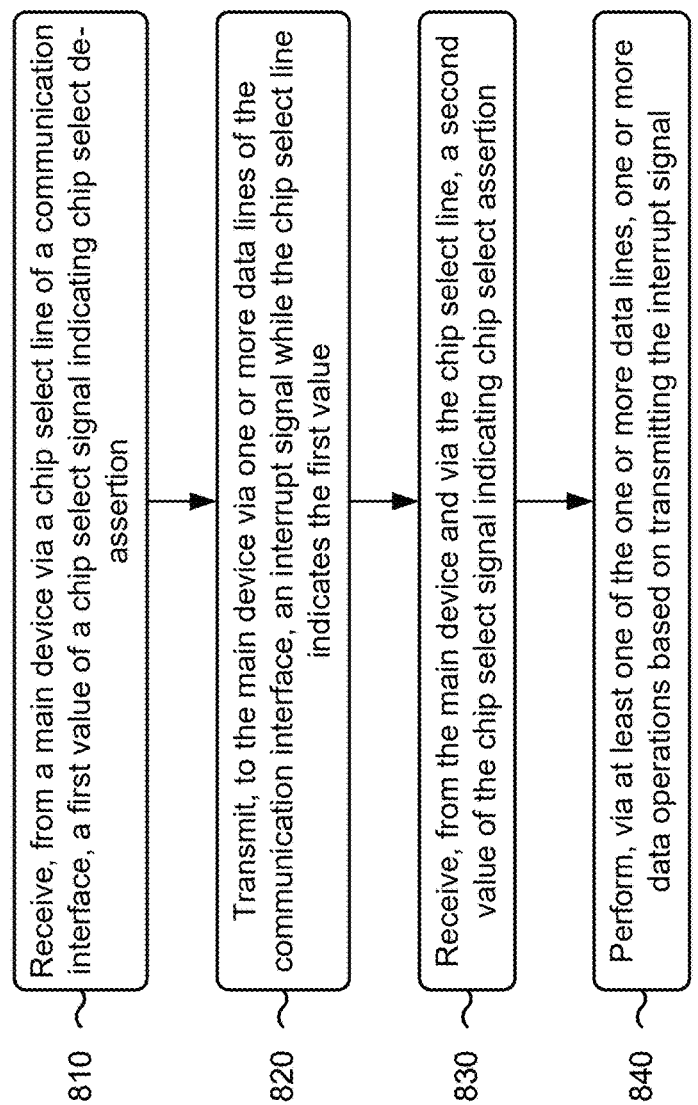

810 Receive, from a main device via a chip select line of a communication interface, a first value of a chip select signal indicating chip select de-assertion 820 Transmit, to the main device via one or more data lines of the communication interface, an interrupt signal while the chip select line indicates the first value 830 Receive, from the main device and via the chip select line, a second value of the chip select signal indicating chip select assertion 840 Perform, via at least one of the one or more data lines, one or more data operations based on transmitting the interrupt signal

IN-BAND INTERRUPT SIGNAL FOR A COMMUNICATION INTERFACE

FIELD OF THE DISCLOSURE

Aspects of the present disclosure generally relate to integrated circuits, memory devices, and, for example, to an in-band interrupt signal for a communication interface.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

In some examples, components of a system (e.g., of an electronic device) may communicate via a communication interface. For example, the components of the system may communicate to transfer data (e.g., stored in memory), to read data from a memory device, and/or to write data to a memory device, among other examples. The communication interface may be a serial interface that is associated with serial communication (e.g., in which data is transferred one bit at a time sequentially over a communication channel or bus).

SUMMARY

In some implementations, a system includes a main device; a target device configured to communicate with the main device via a communication interface; one or more controllers configured to: transmit, by the main device and via a chip select line, a first value of a chip select signal indicating chip select de-assertion; transmit, by the target device and via one or more data lines, an interrupt signal while the chip select line indicates the first value; transmit, by the main device and via the chip select line, a second value of the chip select signal indicating chip select assertion; and perform, via at least one of the one or more data lines, one or more data operations based on the target device transmitting the interrupt signal.

In some implementations, a main device includes one or more controllers configured to: transmit, to a target device and via a chip select line of a communication interface, a first value of a chip select signal indicating chip select de-assertion; receive, from the target device and via one or more data lines of the communication interface, an interrupt signal while the chip select line indicates the first value; transmit, to the target device and via the chip select line, a second value of the chip select signal indicating chip select assertion; and perform, via at least one of the one or more data lines, one or more data operations based on receiving the interrupt signal.

In some implementations, a target device includes one or more controllers configured to: receive, from a main device via a chip select line of a communication interface, a first value of a chip select signal indicating chip select de-assertion; transmit, to the main device via one or more data lines of the communication interface, an interrupt signal while the chip select line indicates the first value; receive, from the main device and via the chip select line, a second value of the chip select signal indicating chip select assertion; and perform, via at least one of the one or more data lines, one or more data operations based on transmitting the interrupt signal.

In some implementations, a method performed by a target device includes receiving, from a main device via a chip select line of a communication interface, a first value of a chip select signal indicating chip select de-assertion; transmitting, to the main device via one or more data lines of the communication interface, an interrupt signal while the chip select line indicates the first value; receiving, from the main device and via the chip select line, a second value of the chip select signal indicating chip select assertion; and performing, with the main device and via at least one of the one or more data lines, one or more data operations based on transmitting the interrupt signal.

In some implementations, a method performed by a system includes transmitting, by a main device of the system via a chip select line of a communication interface, a first value of a chip select signal indicating chip select de-assertion; transmitting, by a target device of the system via one or more data lines of the communication interface, an interrupt signal while the chip select line indicates the first value; transmitting, by the main device and via the chip select line, a second value of the chip select signal indicating chip select assertion; and performing, via at least one of the one or more data lines, one or more data operations based on the target device transmitting the interrupt signal.

In some implementations, a method performed by a main device includes transmitting, to a target device and via a chip select line of a communication interface, a first value of a chip select signal indicating chip select de-assertion; receiving, from the target device and via one or more data lines of the communication interface, an interrupt signal while the chip select line indicates the first value; transmitting, to the target device and via the chip select line, a second value of the chip select signal indicating chip select assertion; and performing, via at least one of the one or more data lines, one or more data operations based on receiving the interrupt signal.

In some implementations, a non-transitory computer-readable medium storing a set of instructions includes one or more instructions that, when executed by one or more processors of a target device, cause the target device to: receive, from a main device via a chip select line of a communication interface, a first value of a chip select signal indicating chip select de-assertion; transmit, to the main device via one or more data lines of the communication interface, an interrupt signal while the chip select line indicates the first value; receive, from the main device and via the chip select line, a second value of the chip select signal indicating chip select assertion; and perform, via at least one of the one or more data lines, one or more data operations based on transmitting the interrupt signal.

In some implementations, a non-transitory computer-readable medium storing a set of instructions includes one or more instructions that, when executed by one or more processors of a system, cause the system to: transmit a first value of a chip select signal indicating chip select de-assertion; transmit an interrupt signal while the chip select line indicates the first value; transmit, via the chip select line, a second value of the chip select signal indicating chip select assertion; and perform, via at least one of the one or more data lines, one or more data operations based on the target device transmitting the interrupt signal.

In some implementations, a non-transitory computer-readable medium storing a set of instructions includes one or more instructions that, when executed by one or more processors of a main device, cause the main device to: transmit, to a target device and via a chip select line of a communication interface, a first value of a chip select signal indicating chip select de-assertion; receive, from the target device and via one or more data lines of the communication interface, an interrupt signal while the chip select line indicates the first value; transmit, to the target device and via the chip select line, a second value of the chip select signal indicating chip select assertion; and perform, via at least one of the one or more data lines, one or more data operations based on receiving the interrupt signal.

In some implementations, an apparatus includes means for receiving, from a main device via a chip select line of a communication interface, a first value of a chip select signal indicating chip select de-assertion; means for transmitting, to the main device via one or more data lines of the communication interface, an interrupt signal while the chip select line indicates the first value; means for receiving, from the main device and via the chip select line, a second value of the chip select signal indicating chip select assertion; and means for performing, via at least one of the one or more data lines, one or more data operations based on transmitting the interrupt signal.

In some implementations, an apparatus includes means for transmitting a first value of a chip select signal indicating chip select de-assertion; means for transmitting an interrupt signal while the chip select line indicates the first value; means for transmitting, via the chip select line, a second value of the chip select signal indicating chip select assertion; and means for performing, via at least one of the one or more data lines, one or more data operations based on the target device transmitting the interrupt signal.

In some implementations, an apparatus includes means for transmitting, to a target device and via a chip select line of a communication interface, a first value of a chip select signal indicating chip select de-assertion; means for receiving, from the target device and via one or more data lines of the communication interface, an interrupt signal while the chip select line indicates the first value; means for transmitting, to the target device and via the chip select line, a second value of the chip select signal indicating chip select assertion; and means for performing, via at least one of the one or more data lines, one or more data operations based on receiving the interrupt signal.

Aspects generally include a method, apparatus, system, computer program product, non-transitory computer-readable medium, user device, user equipment, electronic device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of signaling for in-band interrupt for a target device, in accordance with the present disclosure.

FIG. 5 is a diagram illustrating an example of signaling for in-band interrupt for a target device, in accordance with the present disclosure.

FIG. 6 is a flowchart of an example process associated with an in-band interrupt signal for a communication interface, in accordance with the present disclosure.

FIG. 7 is a flowchart of an example process associated with an in-band interrupt signal for a communication interface, in accordance with the present disclosure.

FIG. 8 is a flowchart of an example process associated with an in-band interrupt signal for a communication interface, in accordance with the present disclosure.

DETAILED DESCRIPTION

Figure 1:
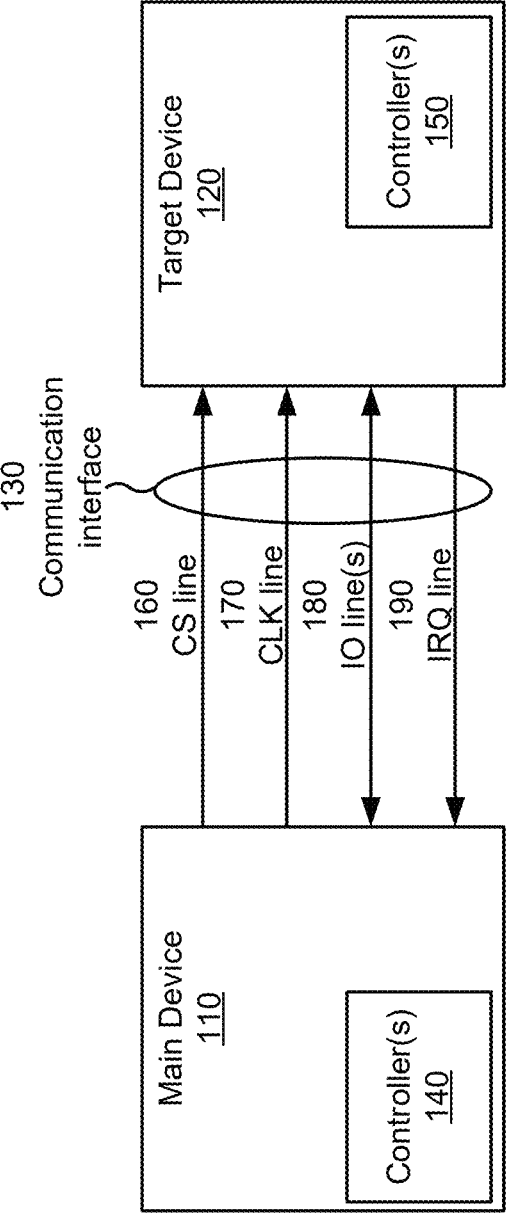
FIG. 1 is a diagram illustrating an example system that supports an in-band interrupt signal for a communication interface, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some examples, components (or devices) of a system may communicate via a communication interface. For example, the components of the system may communicate to transfer data (e.g., stored in memory), to read data from a memory device, and/or to write data to a memory device, among other examples. The communication interface may be a serial interface that is associated with serial communication (e.g., in which data is transferred one bit at a time sequentially over a communication channel or bus). For example, the communication interface may enable communication (e.g., wired communication) between two or more integrated circuits. As an example, the communication interface may be a serial peripheral interface (SPI).

For example, the communication interface may enable communication between a main device (e.g., a primary device or a host device) and one or more target devices (e.g., one or more secondary devices or one or more peripheral devices). Data transfer via the communication interface may occur via one or more data lines (e.g., input/output (IO) lines). During each clock cycle, full-duplex transmission of a single bit may occur. In some examples, the main device may transmit a bit on an IO line (e.g., a main out sub in (MOSI) line) while the target device transmits a bit on an IO line (e.g., a main in sub out (MISO) line), and then each device may read its corresponding incoming bit. In other examples, full-duplex transmission may not occur. There are different types of SPIs, such as dual SPI (e.g., where there are two IO lines and two data pins are used in a half-duplex configuration to transmit two bits per clock cycle) and quad SPI (e.g., where there are four IO lines and four data pins are used in a half-duplex configuration to transmit four bits per clock cycle).

In some examples, the target device may identify a transaction to be initiated with the main device. "Transaction" refers to an operation (e.g., a memory operation) associated with one or more communications via the communication interface, such as a read operation, a write operation, and/or another type of operation. However, there is no standard mechanism to enable the target device to indicate to the main device that the target device has a transaction to perform (e.g., there are no mechanisms to enable the target device to initiate the transaction). To indicate to the main device that the target device has a transaction to be initiated, the target device may transmit an interrupt signal to the main device. However, to transmit the interrupt signal via the communication interface, an additional line and pin (e.g., an interrupt request (IRQ) line) may be configured via which the interrupt signal is transmitted by the target device. An interrupt signal transmitted via an IRQ line may be referred to as an "out-of-band" interrupt signal because the interrupt signal is transmitted via a dedicated channel (e.g., separate from channel(s) used to communicate data over the communication interface).

Therefore, an additional line and pin may be configured between each target device and the main device for the communication interface to enable the target device(s) to transmit interrupt signals to the main device (e.g., via an IRQ line). The additional line(s) and pin(s) results in additional complexity, increased integrated circuit size, increased risk of reduced signal integrity (e.g., caused by noise, crosstalk, or other signal integrity issues caused by simultaneous transmissions over different lines of the communication interface), increased manufacturing complexity, and/or reduced connector space for the devices, among other examples.

Various aspects relate generally to an in-band interrupt signal for a communication interface. "In-band interrupt signal" refers to an interrupt signal that is transmitted via the same channel(s) (e.g., the same one or more pins or lines) used to communicate data via the communication interface. In some aspects, a target device may transmit one or more interrupt signals via one or more data lines of the communication interface when a chip select (CS) signal for the communication interface (e.g., for the target device) is de-asserted. For example, the main device may refrain from transmitting (e.g., may release) the one or more data lines when the CS signal is de-asserted. The target device may drive (e.g., transmit via) the one or more data lines when the CS signal is de-asserted to indicate one or more interrupt signals. For example, the target device may transmit a first value via the one or more data lines (e.g., a logic 1) when the CS signal is de-asserted, to indicate that an interrupt signal is not indicated (e.g., is not asserted). The target device may transmit a second value via the one or more data lines (e.g., a logic 0) when the CS signal is de-asserted, to indicate that an interrupt signal is indicated (e.g., is asserted or transmitted).

In some aspects, one or more delays or periods of time may be used to coordinate the in-band interrupt signal via the one or more data lines. For example, a clock activation delay period may be a period between a time at which the main device asserts a CS signal (e.g., to indicate to the target device that a transaction is starting) and a time at which the clock line starts toggling (e.g., and data is sent on the communication interface). For example, the target device may be configured to refrain from transmitting via (e.g., to release) the one or more data lines within the clock activation delay period. The main device may toggle the clock signal and/or may transmit data via the one or more data lines after the clock activation delay period. As another example, the main device may be configured to de-assert the CS signal for at least a de-assertion time period. As another example, the main device may be configured to refrain from transmitting via (e.g., may release) the one or more data lines within a period of time from the CS signal being de-asserted. Additionally, the target device may be configured to transmit via (e.g., to drive) the one or more data lines after the period of time from the CS signal being de-asserted.

In some aspects, the communication interface may include multiple data lines (e.g., multiple IO lines). In such examples, the multiple data lines may be associated with respective interrupt lines of multiple interrupt lines for the target device. For example, the multiple interrupt lines may be associated with respective channels or respective functions of the target device. In other examples, multiple bit values (e.g., bit-mapped numbers) that are capable of being indicated via the multiple data lines may be mapped to respective functions or channels of the target device. In such examples, the target device may indicate an interrupt signal via the multiple data lines (e.g., where the function or interrupt channel is indicated by a bit-mapped number conveyed via the multiple data lines).

Particular aspects of the subject matter described in this disclosure can be implemented to realize one or more of the following potential advantages. In some examples, by enabling the target device to transmit one or more interrupt signals via the one or more data lines (e.g., when the CS signal is de-asserted), a separate line and/or pin for indicating the interrupt signal may not be needed in the communication interface. This may reduce complexity, reduce an integrated circuit size, reduce risk of degrade signal integrity (e.g., caused by noise, crosstalk, or other signal integrity issues caused by simultaneous transmissions over different lines of the communication interface), reduce manufacturing complexity, and/or increase connector space for the devices, among other examples, as compared to a communication interface that includes the separate line (e.g., the IRQ line) for interrupt signaling. Additionally, by enabling the target device to transmit one or more interrupt signals via the one or more data lines (e.g., when the CS signal is de-asserted), a bandwidth utilization and/or resource utilization for the one or more data lines may be improved because the one or more data lines may be used to transmit the interrupt signal(s) when the one or more data lines may have otherwise been inactive.

Further, by using the one or more delays or periods of time, a coordination for a use of the one or more data lines between the main device and the target device may be improved. For example, the use of the one or more delays or periods of time may reduce a likelihood that the main device and the target device attempt to transmit via the one or more data lines at the same time. For example, by using the clock activation delay period, the system (e.g., that includes the main device and the target device) may ensure that there is enough time for a turn-around time of the data lines and an interrupt de-assertion time for the target device before the clock signal is toggled and/or before data is transmitted via the data lines. This may reduce a likelihood of a "race" condition associated with the main device and the target device attempting to simultaneously transmit via the data lines. As another example, by the main device ensuring that the CS signal is de-asserted for at least the de-assertion time period, a likelihood that an interrupt signal can be asserted and/or detected via the one or more data lines may be improved.

FIG. 1 is a diagram illustrating an example system 100 that supports an in-band interrupt signal for a communication interface, in accordance with the present disclosure. The system 100 may include one or more devices, apparatuses, and/or components for performing operations described herein. For example, the system 100 may include a main device 110 and a target device 120. The main device 110 and the target device 120 may communicate via a communication interface 130. The main device 110 may include one or more controllers 140 (e.g., a processing system) configured to perform one or more operations described herein. The target device may include one or more controllers 150 (e.g., a processing system) configured to perform one or more operations described herein.

The system 100 may be any suitable electronic device (e.g., configured to store data in memory). For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device, among other examples. The system 100 may support an in-band interrupt signal for the communication interface 130, in accordance with the present disclosure. More particularly, as described herein, the in-band interrupt signal mechanisms and the corresponding methods or processes described herein can be employed in any circuit, including but not limited to a microprocessor-based circuit, system, or other suitable electronic device. For example, electronic devices that can include or otherwise employ the in-band interrupt signal mechanisms described herein can include, without limitation, mobile phones, cellular phones, computers, a wireless communication device, portable computers, desktop computers, a laptop computer, a tablet computer, personal digital assistants (PDAs), monitors, computer monitors, televisions, radios, digital video players, and/or a wearable communication device (e.g., a smart wristwatch, a pair of smart eyeglasses, a head mounted display, or a virtual reality headset), among other examples.

The main device 110 may include the one or more controllers 140 configured to execute instructions and store data in memory. For example, the main device 110 may include a central processing unit (CPU), a graphics processing unit (GPU), a field-programmable gate array (FPGA), and/or an application-specific integrated circuit (ASIC), among other examples. The main device 110 may be any device or component capable of generating clock signals, generating CS signals, and/or otherwise controlling communications via the communication interface 130. The main device 110 may be an integrated circuit, a host device, a host system, a controller, a processing system (e.g., a CPU and/or a GPU), an FPGA, an ASIC, a programmable logic controller (PLC), a wireless communication module, a display controller, a storage controller (e.g., a memory controller), and/or a host controller, among other examples.

The target device 120 may be any electronic device configured to perform operations in association with the main device 110 (e.g., as controlled by the main device 110). In some aspects, the target device 120 may be a memory device. For example, the target device may be an electronic device configured to store data temporarily in volatile memory. For example, the target device 120 may be a random-access memory (RAM) device (such as a dynamic RAM (DRAM) device or a static RAM (SRAM) device), a flash memory device, an electrically erasable programmable read-only memory (EEPROM) device, and/or another memory device. As another example, the target device 120 may be an integrated circuit, a controller (e.g., an embedded controller or a microcontroller), a sensor, a display controller, a communication module, an analog-to-digital converter (ADC), a digital-to-analog converter (DAC), a motor controller, and/or a peripheral device (e.g., a keypad controller, a haptic feedback controller, a keyboard controller, or another peripheral device), among other examples.

In some aspects, the main device 110 may include a high-level controller, which may communicate directly with and/or may instruct one or more low-level controllers regarding memory operations to be performed in connection with one or more memories. In some examples, the target device 120 may include a low-level controller, which may receive instructions regarding memory operations from a high-level controller that interfaces directly with the main device 110. As an example, a high-level controller may be a solid state drive (SSD) controller, and a low-level controller may be a non-volatile memory controller (e.g., a NAND controller) or a volatile memory controller (e.g., a DRAM controller). In some aspects, a set of operations described herein as being performed by the main device 110 or the target device 120 may be performed by a single controller (e.g., the entire set of operations may be performed by a single high-level or low-level controller). Alternatively, a set of operations described herein as being performed by the main device 110 or the target device 120 may be performed by more than one controller (e.g., a first subset of the operations may be performed by a high-level controller and a second subset of the operations may be performed by a low-level controller).

The communication interface 130 enables communication between the main device 110 and the target device 120. The communication interface 130 may also be referred to as an interface, a bus (e.g., a system bus, a communication bus, or a messaging bus), and/or a wireline interface, among other examples. The communication interface 130 may include, for example, an SPI, quad SPI (QSPI), octal SPI (OSPI), hexadecimal SPI (HSPI), expanded SPI (xSPI), xSPI+, a local interconnect network (LIN) interface, a two-wire interface (TWI), and/or another interface having similar lines as described herein (e.g., a CS line and one or more IO (or data) lines). The communication interface 130 may include a CS line 160, a clock (CLK) line 170, one or more IO lines 180 (e.g., one or more data lines), and/or one or more IRQ lines 190, among other examples.

The main device 110 may be a device that orchestrates communication over the communication interface by providing one or more clock signals via the CLK line 170 and/or one or more CS signals via the CS line 160. For example, a timing of data transfer via the communication interface may be indicated by the clock signal (e.g., data transfer may occur on a rising edge and/or a falling edge of the clock signal). A CS signal may be associated with two (or more) states, such as a high state (referred to herein as a high pulse) or a low state (referred to herein as a low pulse). For a high pulse, the CS signal may transition to a high voltage and stay at the high voltage for a duration (e.g., an amount of time). For a low pulse, the CS signal may transition to a low voltage and stay at the low voltage for a duration (e.g., an amount of time). An indication that a target device 120 is selected or asserted for a given command may be mapped to a first CS signal state and an indication that a target device 120 is not selected for a given command may be mapped to a second CS signal state. In some examples, the low pulse may indicate that a target device 120 is selected (e.g., that an operation or communication is to occur for the target device) and a high pulse may indicate that the target device 120 is not selected. A CS signal indicating the first CS signal state may be referred to as the CS signal being "asserted" (e.g., indicating that a target device is selected and/or that an operation is to occur as driven by the main device). A CS signal indicating the second CS signal state may be referred to as the CS signal being "de-asserted" (e.g., indicating that the target device 120 is not selected and/or that no operation is to occur as driven by the main device 110).

The main device 110 and the target device 120 may both include a CS terminal connected by the CS line 160. In some examples, the CS terminal may be a CS-not (CSN) terminal, meaning that the CS signal is an active low signal. The CS signal is transmitted from the main device 110 and is used to select and/or enable the target device 120 for SPI communication. Driving the CSN signal low enables the communication. Thus, the main device 110 may transmit a logic 0 on the CSN signal to select the target device 120.

The main device 110 and the target device 120 may be configured to communicate (e.g., transmit and/or receive) data via the one or more IO lines 180. The one or more IO lines 180 may also be referred to as data lines, and/or data in or out (DQ) lines (or DQ pins), among other examples. For example, the main device 110 and the target device 120 may include respective data registers and may be capable of performing data operations (e.g., read and write operations) from/to the data registers at the control of the main device 110. For example, a read operation is a data transmission originating at the target device 120 and terminating at the main device 110, and a write operation may be a data transmission originating at the main device 110 and terminating at the target device 120.

For example, the system 100 may be an SPI communication system. In an SPI communication configuration, the main device 110 and the target device 120 both include an SPI clock terminal connected by the CLK line 170 that transmits a clock signal (e.g., a communication clock signal, such as an SPI clock signal). The main device 110 generates the clock signal. Data transmitted between the main device 110 and the target device 120 is synchronized to the clock generated by the main device 110. During SPI communication, the data is simultaneously transmitted (shifted out serially onto a MOSI or serial data input (SDI) signal line) and received (data on a MISO or serial data out (SDO) line is sampled or read in). A serial clock edge synchronizes the shifting and sampling of the data. The SPI interface provides the system 100 with flexibility to select the rising or falling edge of the clock to sample and/or shift the data. Each clock cycle represents a bit. While SPI communications may be described with respect to one or more aspects herein, another type of digital communication protocol may be used for communication between the main device 110 and the target device 120.

In some examples, the communication interface 130 may be a one-to-one interface. In such examples, there may be a single main device 110 and a single target device 120. In other examples, the communication interface 130 may be a one-to-many interface. In such examples, there may be a single main device 110 and multiple target devices 120. In some examples, the communication interface 130 may include the IRQ line 190 for out-of-band interrupt signaling from the target device 120 to the main device 110 (e.g., in addition to in-band interrupt signaling via the one or more IO lines 180, as described in more detail elsewhere herein). In other examples, the communication interface 130 may not include the IRQ line 190 for out-of-band interrupt signaling from the target device 120 to the main device 110 (e.g., an in-band interrupt signaling via the one or more IO lines 180 may be used, as described in more detail elsewhere herein).

One or more devices or components shown in FIG. 1 may be configured to perform operations described herein, such as one or more operations and/or methods described in connection with FIGS. 2A, 2B, and 3-9. For example, the main device 110, the target device 120, the one or more controllers 140, and/or the one or more controllers 150 may be configured to perform one or more operations and/or methods as described herein.

In some aspects, as described in more detail elsewhere herein, the system 100 includes means for transmitting a first value of a CS signal indicating chip select de-assertion; means for transmitting, via one or more data lines (e.g., the one or more IO lines 180) of the communication interface 130, an interrupt signal while a CS signal is de-asserted; means for transmitting a second value of the CS signal indicating CS assertion; and/or means for performing, via at least one of the one or more data lines 180, one or more data operations based on transmitting the interrupt signal. The means for the system 100 to perform processes and/or operations described herein may include one or more systems, devices, apparatuses, components, and/or controllers of FIG. 1 (e.g., the system 100), such as the main device 110, the target device 120, the one or more controllers 140, and/or the one or more controllers 150. Additionally, or alternatively, one or more systems, devices, apparatuses, components, and/or controllers of FIG. 1 may be configured to perform one or more other operations described herein.

In some aspects, as described in more detail elsewhere herein, the main device 110 may include means for transmitting, to a target device 120 and via a CS line 160 of a communication interface 130, a first value of a chip select signal indicating chip select de-assertion; means for receiving, from the target device 120 and via one or more IO lines 180 of the communication interface 130, an interrupt signal while the CS line 160 indicates the first value; means for transmitting, to the target device 120 and via the CS line 160, a second value of the chip select signal indicating chip select assertion; and/or means for performing, with the target device 120 and via at least one of the one or more IO lines 180, one or more data operations based on receiving the interrupt signal. The means for the main device 110 to perform processes and/or operations described herein may include one or more systems, devices, apparatuses, components, and/or controllers of FIG. 1, such as the main device 110, and/or the one or more controllers 140. Additionally, or alternatively, one or more systems, devices, apparatuses, components, and/or controllers of the main device 110 may be configured to perform one or more other operations described herein.

In some aspects, as described in more detail elsewhere herein, the target device 120 may include means for receiving, from a main device 110 via a CS line 160 of a communication interface 130, a first value of a CS signal indicating chip select de-assertion; means for transmitting, to the main device 110 via one or more IO lines 180 of the communication interface 130, an interrupt signal while the CS line 160 indicates the first value; means for receiving, from the main device 110 and via the CS line 160, a second value of the chip select signal indicating chip select assertion; and/or means for performing, with the main device 110 and via at least one of the one or more IO lines 180, one or more data operations based on transmitting the interrupt signal. The means for the target device 120 to perform processes and/or operations described herein may include one or more systems, devices, apparatuses, components, and/or controllers of FIG. 1, such as the target device 120, and/or the one or more controllers 150. Additionally, or alternatively, one or more systems, devices, apparatuses, components, and/or controllers of the target device 120 may be configured to perform one or more other operations described herein.

One or more devices or components shown in FIG. 1 may be configured to perform operations described herein, such as one or more operations and/or methods described in connection with FIGS. 2A, 2B, and/or 3-9.

As indicated above, FIG. 1 is provided as an example. Other examples may differ from what is described with regard to FIG. 1. For example, some aspects described herein are broadly applicable to other circuits, including circuits that are fully contained on-die (e.g., within a system-on-chip (SoC)) and/or circuits associated with non-memory external interfaces (e.g., a serializer/deserializer (SerDes)).

Figure 2A:
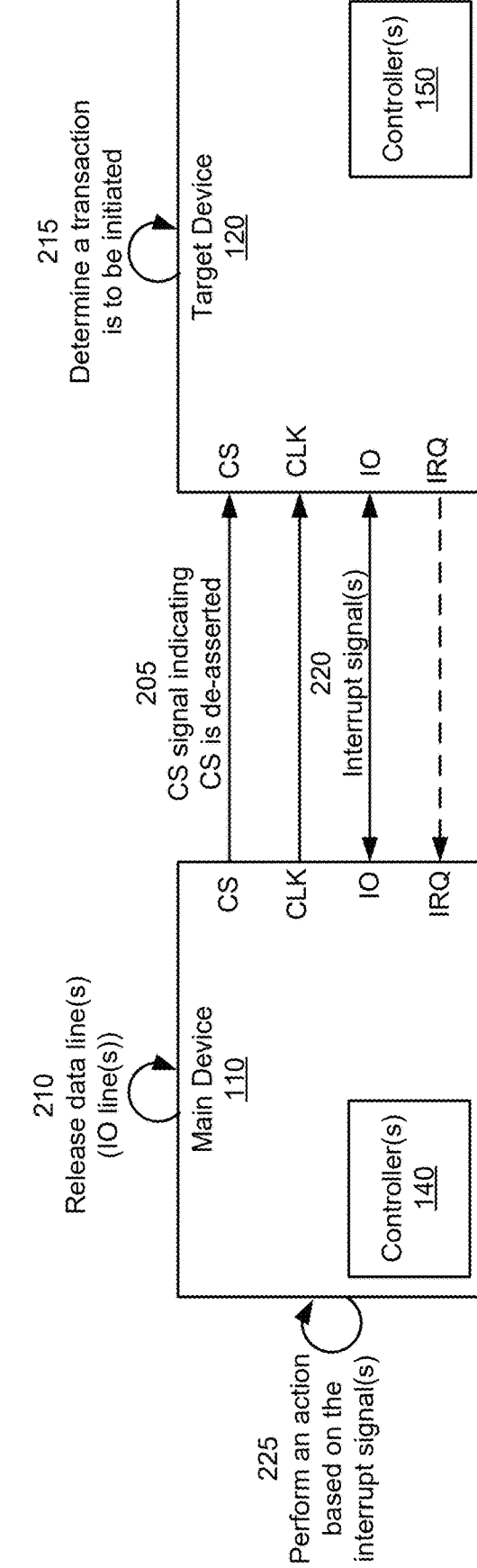
FIGS. 2A and 2B are diagrams illustrating an example of an in-band interrupt signal for a communication interface, in accordance with the present disclosure.
Figure 2B:
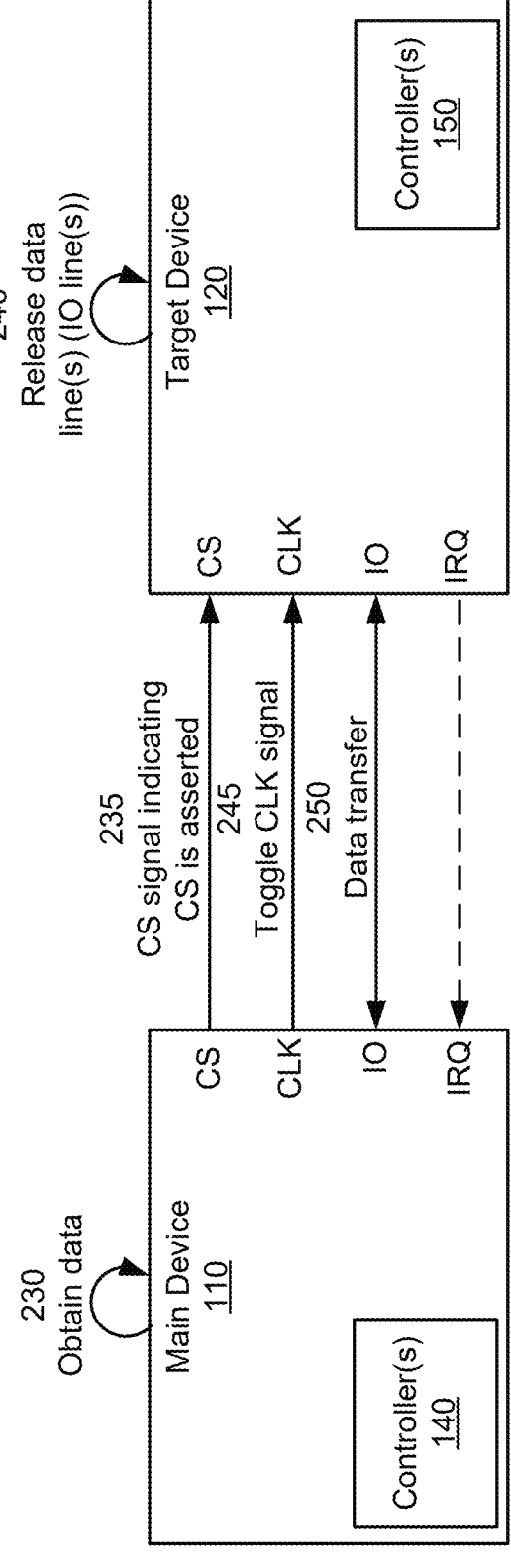

FIGS. 2A and 2B are diagrams illustrating an example 200 of an in-band interrupt signal for a communication interface, in accordance with the present disclosure. The operations depicted and/or described in connection with FIGS. 2A and 2B may be performed by the system 100, the main device 110, and/or the target device 120. The main device 110 and the target device 120 may communicate via the communication interface 130 to perform one or more operations described in connection with FIGS. 2A and 2B.

As shown in FIG. 2A, and by reference number 205, the main device 110 may transmit, and the target device 120 may receive, a CS signal indicating that the CS (e.g., for the target device 120) is de-asserted. The main device 110 may transmit, and the target device may receive, the CS signal via the CS line 160. The CS signal may indicate a first value (e.g., a first logic value or a first state) of the CS signal indicating chip select de-assertion. For example, if the CS signal is an active low signal (e.g., where a low state or logic "0" indicates CS assertion or that the target device 120 is selected for a transaction), then the first value may be a high value or logic 1. If the CS signal is an active high signal (e.g., where a high state or logic "1" indicates CS de-assertion or that the target device 120 is not selected for a transaction), then the first value may be a low value or logic 0.

In some aspects, the main device 110 may transmit, via the CS line 160, the first value for at least a de-assertion time period (e.g., a tCSMin time period). For example, the de-assertion time period may be an amount of time (e.g., a minimum amount of time) that the CS signal is to be de-asserted for the target device 120. In some aspects, the de-assertion time period may be based on, or otherwise associated with, an amount of time for the target device 120 to transmit or assert an interrupt signal via one or more data lines (e.g., the one or more IO lines 180), as described in more detail elsewhere herein. Additionally, or alternatively, the de-assertion time period May be based on, or otherwise associated with, an amount of time for the main device 110 to detect and/or process one or more interrupt signals that are transmitted via the one or more data lines. In other words, the main device 110 may de-assert the CS signal for the target device 120 for at least the de-assertion time period to allow for in-band interrupt signals to be asserted and detected.

As shown by reference number 210, the main device 110 may release the one or more data lines (e.g., the one or more IO lines 180). For example, the main device 110 may release the one or more data lines based on, in response to, or otherwise associated with transmitting the CS signal having the first value (e.g., based on, in response to, or otherwise associated with de-asserting the CS signal for the target device 120). For example, the main device 110 may refrain from transmitting via (e.g., from driving) the one or more data lines based on, in response to, or otherwise associated with de-asserting the CS signal for the target device 120.

In some aspects, the main device 110 may release (e.g., may refrain from transmitting via, or refrain from driving) the one or more data lines within a period of time (e.g., a tDST time period) after the CS line 160 indicates the first value of the CS signal indicating chip select de-assertion. In other words, the main device 110 may release the one or more data lines within the tDST time period after de-asserting the CS signal for the target device 120. The tDST time period may be a period of time between the CS signal de-assertion and a time at which the target device 120 may begin driving the one or more data lines for in-band interrupt signal assertion, as described in more detail elsewhere herein. For example, the main device 110 may release the one or more data lines within the tDST time period and the target device 120 may begin driving the one or more data lines at (or after) an expiration of the tDST time period. The tDST time period may reduce a likelihood that the target device 120 attempts to transmit via the one or more data lines at the same time that the main device 110 is driving the one or more data lines after the CS signal de-assertion. In other words, the tDST time period may provide a delay after CS signal de-assertion to allow time for the main device 110 to release the one or more data lines before the target device 120 begins to drive the data line(s) for interrupt signaling. Additionally, the tDST time period may provide a delay after CS signal de-assertion to allow time for the main device 110 to initiate use of a detection circuit that is configured to sense interrupt signals from the target device 120 via the one or more data lines.

The target device 120 may drive (e.g., transmit via or control communication via) the one or more data lines (e.g., the one or more IO lines 180) while the CS signal is de-asserted for the target device 120 (e.g., as indicated by the first value being transmitted via the CS line 160). For example, the target device 120 may transmit a first value (e.g., a first logic value) via the one or more data lines to indicate no interrupt signaling (e.g., to indicate that the interrupt signal is de-asserted). The target device 120 may transmit a second value (e.g., a second logic value) via the one or more data lines to indicate interrupt signaling (e.g., to indicate that the interrupt signal is asserted). For example, the first value may be a logic 1 and the second value may be a logic 0 (e.g., if the interrupt signaling is active low). In other examples, the first value may be a logic 0 and the second value may be a logic 1 (e.g., if the interrupt signaling is active high). For example, the target device 120 may drive the one or more data lines to a high value (e.g., a high state or high voltage to indicate a logic 1) when the CS signal is de-asserted, to indicate that an interrupt signal is de-asserted. The target device 120 may drive the one or more data lines to a low value (e.g., a low state or low voltage to indicate a logic 0) when the CS signal is de-asserted, to indicate that an interrupt signal is asserted.

For example, as shown by reference number 215, the target device 120 may determine that a transaction is to be initiated. For example, the target device 120 may determine that a data operation is to be initiated. The data operation may be a memory operation. In some examples, the data operation may be a read operation (e.g., associated with the target device 120 reading or obtaining data from memory accessible by the main device 110), a write operation (e.g., associated with the target device 120 writing or providing data to memory accessible by the main device 110), or another data operation. In other words, the transaction may be a data exchange between the target device 120 and the main device 110.

In some aspects, the transaction may be associated with a channel (e.g., an interrupt channel) and/or a function of the target device 120. For example, the target device 120 may be configured to perform or control one or more functions (e.g., of the system or of an electronic device). For example, the one or more functions may be associated with respective peripheral devices of the system 100 (e.g., a keyboard, a display, an input device, a fan, or another peripheral device). The target device 120 may determine an interrupt channel that is mapped to the function.

As shown by reference number 220, the target device 120 may transmit, and the main device 110 may receive, one or more interrupt signals via the one or more data lines (e.g., while the CS signal is de-asserted for the target device 120). For example, based on, in response to, or otherwise associated with determining that the transaction is to be initiated, the target device 120 may transmit an interrupt signal via at least one of the data lines. For example, the target device 120 may drive one or more data lines (e.g., IO lines) to a given value (e.g., a low value if the interrupt signal is active low) to assert the interrupt signal (e.g., for a given interrupt channel or function) based on, in response to, or otherwise associated with determining that the transaction is to be initiated. The target device 120 may transmit the interrupt signal at least a period of time (e.g., the tDST time period) after the time at which the CS signal is de-asserted for the target device 120.

The in-band interrupt signal transmitted by the target device 120 may be a level-triggered interrupt signal. A level-triggered interrupt may be requested by holding the interrupt signal at a particular (high or low) active logic level. The target device 120 may invoke a level-triggered interrupt by driving the one or more data lines to, and holding the one or more data lines at, the active level. The target device 120 may negate (e.g., de-assert) the interrupt signal after the target device has been serviced (e.g., after the transaction that triggered the interrupt signal to be asserted has been performed). In other words, the target device 120 may keep the interrupt signal asserted until the cause of the interrupt signal is resolved.

The in-band interrupt signal transmitted by the target device 120 may be an asynchronous signal. For example, the in-band interrupt signal may be transmitted by the target device 120 while the clock signal (e.g., CLK line 170) is not being toggled (e.g., as depicted and described in more detail in connection with FIG. 3). This may improve the flexibility for the target device 120 to transmit the interrupt signal while the target device 120 is not selected for operation by the main device 110.

As shown by reference number 225, the main device 110 may perform an action based on the one or more interrupt signals. For example, the main device 110 may detect the interrupt signal (e.g., via an interrupt controller of the main device 110). The main device 110 may handle the interrupt by temporarily suspending a current task and transferring control of the main device 110 (or of one or more components of the main device 110) to an interrupt service routine (ISR). The ISR may be configured to detect, decode, and/or handle the one or more interrupt signals and/or to perform one or more actions to resolve the one or more interrupt signals. In some aspects, the main device 110 may perform context switching to execute the ISR. After a completion of the ISR, the main device 110 may resume the task that was temporarily suspended.

For example, as shown in FIG. 2B and reference number 230, in some aspects, the main device 110 may obtain data. For example, the main device 110 may obtain data from a memory device. As an example, the data may be associated with a read operation initiated by the target device 120 via the interrupt signal(s). As shown by reference number 235, the main device 110 may transmit, and the target device 120 may receive, a second value of the CS signal (e.g., via the CS line 160) indicating a CS assertion. For example, to perform the transaction (e.g., the data operation), the main device 110 may assert the CS signal (e.g., may drive the CS line 160 to an active level, such as a logic high (1) or a logic low (0)) for the target device 120.

As shown by reference number 240, the target device 120 may release the one or more data lines (e.g., the one or more IO lines 180). For example, based on, in response to, or otherwise associated with the CS signal being asserted for the target device 120, the target device 120 may release (e.g., may refrain from transmitting via or refrain from driving) the one or more data lines. The target device 120 may refrain from transmitting using the one or more data lines within a clock activation delay time period (e.g., a tSCK time period) after the CS line 160 indicates the second value of the CS signal indicating chip select assertion. In other words, the target device 120 may release the one or more data lines within the tSCK time period after the CS signal is asserted for the target device 120.

The tSCK time period may be a period of time between a time that the main device 110 asserts the CS signal (e.g., to indicate to the target device 120 that a transaction is starting) and a time when the CLK line 170 starts toggling (e.g., and data is transmitted via the communication interface 130). For example, the main device 110 may drive the one or more data lines only at, or after, an expiration of the tSCK time period after the CS signal is asserted for the target device 120. For example, as shown by reference number 245, the main device 110 may toggle a clock signal via the CLK line 170. The main device 110 may begin to toggle the clock signal at, or after, an expiration of the tSCK time period after the CS signal is asserted for the target device 120.

The main device 110 and the target device 120 may perform, via at least one of the one or more data lines, one or more data operations based on the target device 120 transmitting the interrupt signal (e.g., as described in connection with reference number 220) and/or based on the main device 110 asserting the CS signal (e.g., as described in connection with reference number 235). For example, as shown by reference number 250, the main device 110 and the target device 120 may perform, via at least one of the one or more data lines, a data transfer. In some aspects, the data transfer may include the main device 110 transmitting, and the target device 120 receiving, data via at least one of the one or more data lines. In other aspects, the data transfer may include the target device 120 transmitting, and the main device 110 receiving, data via at least one of the one or more data lines. The data operation may include the transaction initiated by the target device 120 (e.g., the transaction described in connection with reference number 215). For example, the main device 110 and the target device 120 may perform the transaction that caused by target device 120 to transmit the in-band interrupt signal.

The main device 110 and the target device 120 may perform (or initiate) the data operation at, or after, an expiration of the tSCK time period after the CS signal is asserted for the target device 120. For example, by delaying the toggling of the clock signal and/or the initiation of the data operation by the tSCK time period after the CS signal is asserted for the target device 120, a likelihood that the target device 120 and the main device 110 attempt to simultaneously transmit via a data line may be reduced.

As indicated above, FIGS. 2A and 2B are provided as examples. Other examples may differ from what is described with respect to FIGS. 2A and 2B.

Figure 3:
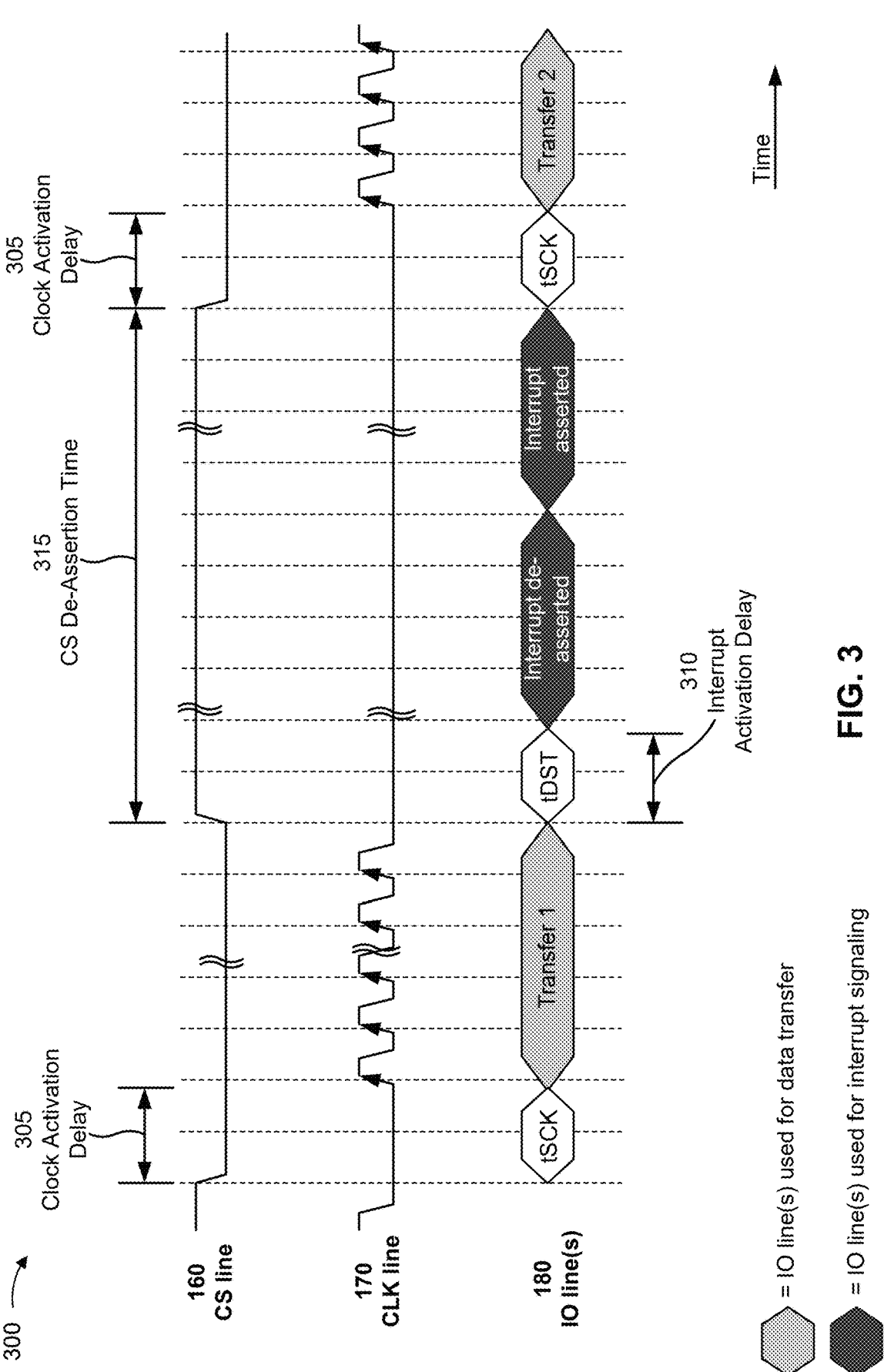
FIG. 3 is a diagram illustrating an example of signaling for in-band interrupt for a target device, in accordance with the present disclosure.

FIG. 3 is a diagram illustrating an example 300 of signaling for in-band interrupt for a target device, in accordance with the present disclosure. FIG. 3 depicts signaling via one or more lines of the communication interface, such as the CS line 160, the CLK line 170, and the one or more IO lines 180 (referred to as data lines elsewhere herein). The CS line 160 and the CLK line 170 may be driven by the main device 110. When the CS line 160 indicates that the CS signal is asserted (e.g., via driving the CS line 160 low, as shown in FIG. 3 as an example), then the one or more IO lines 180 may be used for data transfer operations. For example, the one or more IO lines 180 may be driven by the main device 110 (e.g., for read operations) or by the target device 120 (e.g., for write operations). When the CS line 160 indicates that the CS signal is de-asserted (e.g., via driving the CS line 160 high, as shown in FIG. 3 as an example), then the one or more IO lines 180 may be used for interrupt signaling. For example, the one or more IO lines 180 driven by the target device 120 (e.g., for in-band interrupt signaling) and may be monitored or sensed by the main device 110 (e.g., to detect interrupt signals transmitted by the target device 120 via the one or more IO lines 180).

As shown in FIG. 3, the CS signal may be asserted via the CS line 160 (e.g., driven to an active level, such as a low level as shown in FIG. 3). The main device 110 may delay a data operation and/or a toggling of the clock signal via the CLK line 170 for a clock activation delay time period 305 (e.g., after asserting the CS signal via the CS line 160). This may enable the target device 120 to release the one or more IO lines 180 that may have been used for in-band interrupt signaling while the CS signal was de-asserted, as described elsewhere herein. As shown in FIG. 3, the main device 110 and the target device 120 may perform a data transfer operation (shown as "Transfer 1" in FIG. 3) while the CS signal is asserted.

After some time, the main device may de-assert the CS signal (e.g., by driving the CS line 160 to a non-active level, such as a high level as shown in FIG. 3). For example, the main device 110 may de-assert the CS signal when the main device 110 does not have any operations to perform with the target device 120. The main device 110 may keep the CS signal de-asserted for at least a CS de-assertion time period 315 (also referred to herein as a de-assertion time period). The CS de-assertion time period 315 may be an amount of time (e.g., a minimum amount of time) that the CS signal is to be de-asserted for the target device 120 by the main device 110. In other words, the main device 110 may de-assert the CS signal for the target device 120 for at least the CS de-assertion time period 315 to allow for in-band interrupt signals to be asserted and detected via the one or more IO lines 180.

For example, as shown in FIG. 3, the target device 120 may drive the one or more IO lines 180 while the CS signal is de-asserted to assert one or more interrupt signals. For example, the target device 120 may drive the one or more IO lines 180 for in-band interrupt signaling after an interrupt activation delay period 310 (e.g., the tDST time period). For example, the main device 110 may release the one or more IO lines 180 within the interrupt activation delay period 310. The interrupt activation delay period 310 may reduce a likelihood of the main device 110 and the target device 120 attempting to drive the one or more IO lines 180 at the same time. As shown in FIG. 3, the target device 120 may drive the one or more IO lines 180 to a non-active level for interrupt signaling, such as a high level or logic 1, such as shown by "interrupt de-asserted" in FIG. 3. In some aspects, while the CS signal is de-asserted, the target device may determine that an interrupt signal is to be transmitted to the main device 110 (e.g., the target device 120 may determine to assert the interrupt signal). Therefore, the target device 120 may drive the one or more IO lines 180 to an active level for interrupt signaling. The main device 110 may be configured to monitor for and/or detect the interrupt signal via the one or more IO lines 180 while the CS signal is de-asserted for the target device 120.

In some aspects, based on the target device 120 transmitting or asserting the interrupt signal via the one or more IO lines 180 (and/or based on the main device 110 detecting the interrupt signal via the one or more IO lines 180), the main device 110 may assert the CS signal for the target device to initiate a transaction indicated by the interrupt signal. For example, as shown in FIG. 3, the CS signal may be asserted via the CS line 160 (e.g., driven to an active level, such as a low level as shown in FIG. 3). The main device 110 may delay a data operation and/or a toggling of the clock signal via the CLK line 170 for a clock activation delay time period 305 (e.g., after asserting the CS signal via the CS line 160). The main device 110 and the target device 120 may perform a data transfer operation (shown as "Transfer 2" in FIG. 3) while the CS signal is asserted. The data transfer operation (e.g., the transfer 2) may be an operation initiated by, or requested by, the in-band interrupt signal transmitted by the target device 120 via the one or more data lines 180. If the cause of the interrupt signal for the target device 120 is resolved, then the target device 120 may release and/or de-assert the interrupt signal. Otherwise, if the cause of the interrupt signal for the target device 120 is not resolved, then the target device 120 may assert the interrupt signal again (e.g., may re-assert the interrupt signal) via the one or more IO lines 180 after the CS signal is de-asserted, in a similar manner as described elsewhere herein.

In some examples, the target device 120 may transmit via the one or more IO lines 180 (e.g., may assert an interrupt signal via the one or more IO lines 180 by driving the one or more IO lines to an active level for interrupt signaling) at the same time (or approximately the same time, such as within a tolerance) that the main device 110 asserts the CS signal via the CS line 160. For example, while the CS signal is de-asserted (e.g., while the CS line 160 is driven to the non-active level, such as a high level as shown in FIG. 3), the target device 120 may drive an IO line 180 to assert an interrupt signal. At the same time, or approximately the same time (e.g., if a difference in time between when the target device 120 drives the IO line 180 and when the main device 110 asserts the CS signal is less than or equal to a threshold), the main device 110 may assert the CS signal by driving the CS line 160 to the active level for the CS signal. In such examples, the target device 120 may refrain from transmitting using the one or more data lines within a period of time after the CS signal is asserted (e.g., within the clock activation delay time period 305 after the CS signal is asserted). In other words, if the main device 110 asserts the CS signal and the target device 120 asserts an interrupt signal at the same time (or approximately the same time), then the target device 120 may mask the interrupt signal (e.g., by releasing the one or more IO lines 180) (e.g., within the clock activation delay time period). The target device may assert the interrupt signal again (e.g., may re-assert the interrupt signal) after the CS signal is de-asserted, in a similar manner as described in more detail elsewhere herein.

As indicated above, FIG. 3 is provided as an example. Other examples may differ from what is described with respect to FIG. 3.

Figure 4:
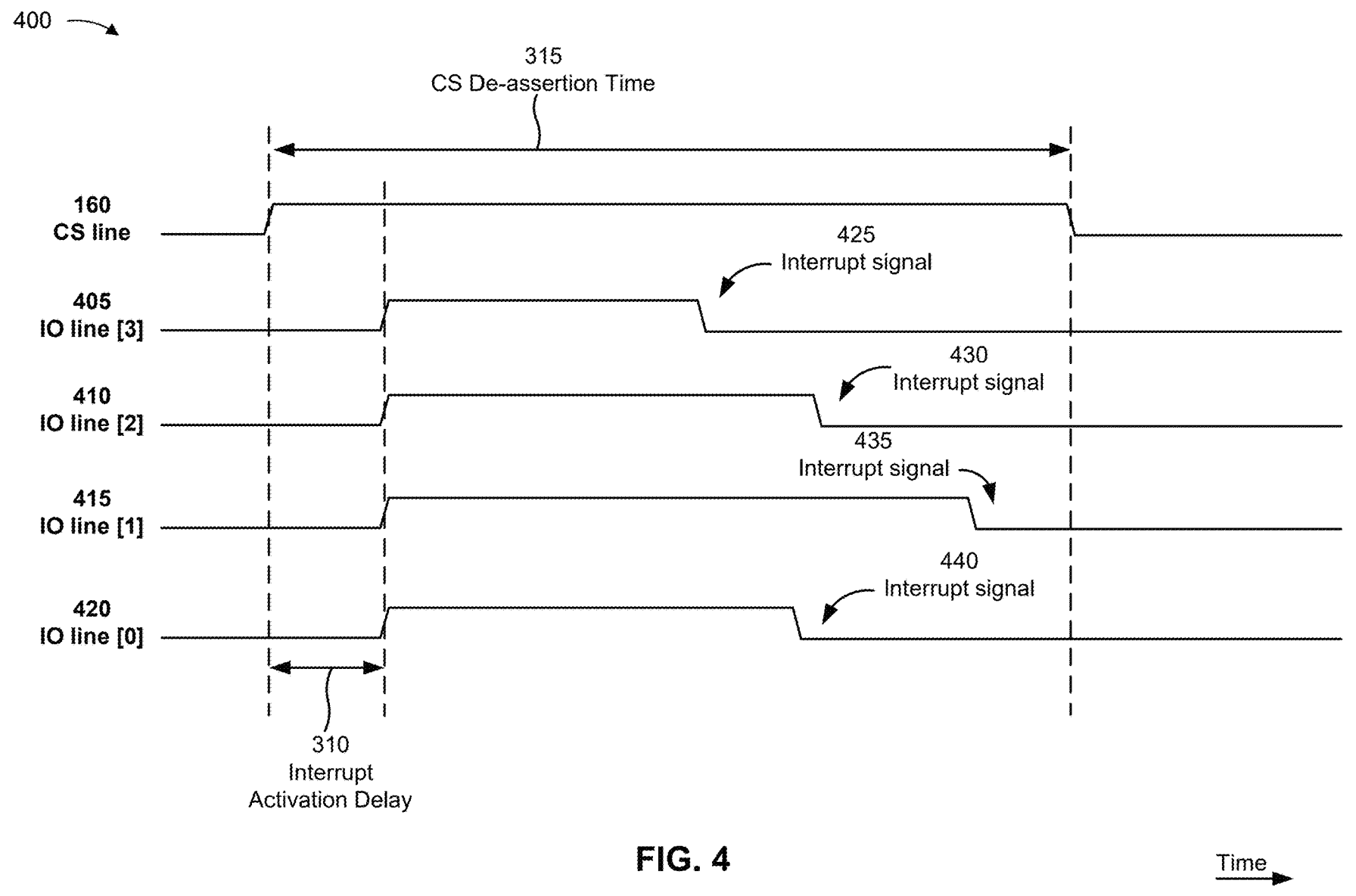

FIG. 4 is a diagram illustrating an example 400 of signaling for in-band interrupt for a target device, in accordance with the present disclosure. FIG. 4 depicts signaling via one or more lines of the communication interface, such as the CS line 160, and the one or more IO lines 180 (shown as four IO lines 180, such as an IO line 405, an IO line 410, an IO line 415, and an IO line 420). When the CS line 160 indicates that the CS signal is de-asserted (e.g., via driving the CS line 160 high, as shown in FIG. 4 as an example), then the one or more IO lines 180 may be driven by the target device 120 (e.g., for in-band interrupt signaling). FIG. 4 depicts a communication interface 130 that includes four IO lines 180 as an example (e.g., for a quad SPI configuration). However, in other aspects, the communication interface may include a different quantity of IO lines 180, such as two IO lines, one IO line, or another quantity of IO lines.

As shown in FIG. 4, each IO line may be mapped to a different interrupt channel. Each interrupt channel may be mapped to a different function or component associated with the target device 120. For example, the IO line 405 may be mapped to a first interrupt channel and/or a first function. The IO line 410 may be mapped to a second interrupt channel and/or a second function. The IO line 415 may be mapped to a third interrupt channel and/or a third function. The IO line 420 may be mapped to a fourth interrupt channel and/or a fourth function.

In a similar manner as described elsewhere herein, the target device 120 may begin asserting one or more interrupt signals (e.g., via respective interrupt channels) when the CS signal is de-asserted via the CS line 160 (e.g., after the interrupt activation delay time period 310). For example, the CS signal may be de-asserted for at least the CS de-assertion time period 315, as described elsewhere herein.

As shown in FIG. 4, the target device may separately indicate interrupt signals for different interrupt channels by driving different IO lines 180. For example, an interrupt signal 425 may be indicated via the IO line 405 (e.g., at a first time) for the first interrupt channel (and/or for the first function) by driving the IO line 405 to an active level for interrupt signaling (e.g., shown as a low level or logic 0 in FIG. 4). As another example, an interrupt signal 430 may be indicated via the IO line 410 (e.g., at a second time) for the second interrupt channel (and/or for the second function) by driving the IO line 410 to the active level for interrupt signaling. As another example, an interrupt signal 435 may be indicated via the IO line 415 (e.g., at a third time) for the third interrupt channel (and/or for the third function) by driving the IO line 415 to the active level for interrupt signaling. Similarly, an interrupt signal 440 may be indicated via the IO line 420 (e.g., at a fourth time) for the fourth interrupt channel (and/or for the fourth function) by driving the IO line 420 to the active level for interrupt signaling.

This may increase flexibility for the target device 120 to indicate interrupt signals for different interrupt channels at different times while the CS signal is de-asserted. For example, the target device 120 may have multiple interrupt signals (e.g., for different interrupt channels) asserted at the same time. For example, within the CS de-assertion time period 315, the target device 120 may assert multiple interrupt signals. For example, if the communication interface includes four IO lines 180 (e.g., as shown in FIG. 4), then the target device 120 may assert up to four interrupt signals during a single de-assertion time period 315. This may reduce a latency associated with the target device 120 asserting the multiple interrupt signals for different interrupt channels and/or for different functions.

As indicated above, FIG. 4 is provided as an example. Other examples may differ from what is described with respect to FIG. 4.

Figure 5:
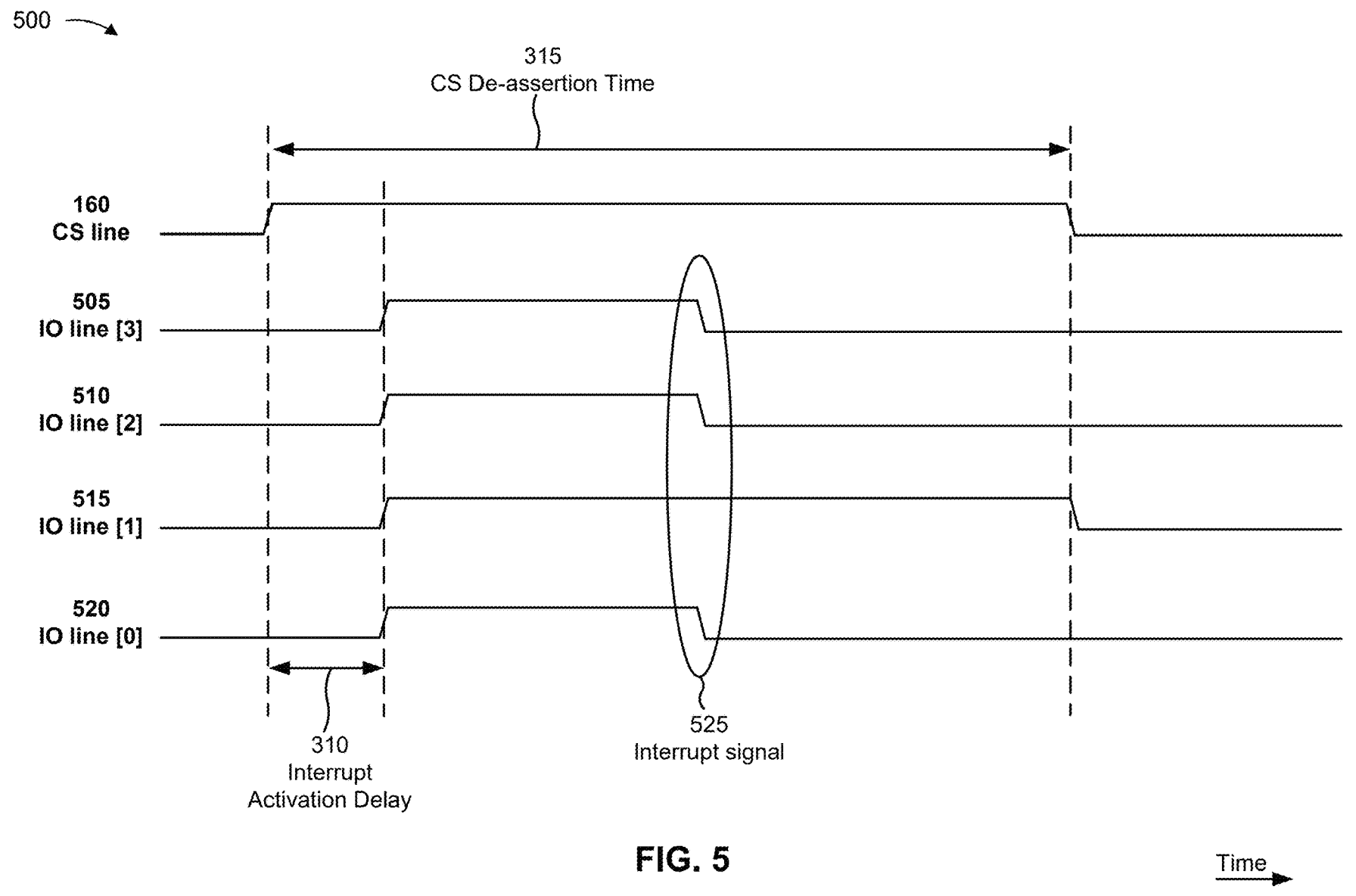

FIG. 5 is a diagram illustrating an example 500 of signaling for in-band interrupt for a target device, in accordance with the present disclosure. FIG. 5 depicts signaling via one or more lines of the communication interface, such as the CS line 160, and the one or more IO lines 180 (shown as four IO lines 180, such as an IO line 505, an IO line 510, an IO line 515, and an IO line 520). When the CS line 160 indicates that the CS signal is de-asserted (e.g., via driving the CS line 160 high, as shown in FIG. 5 as an example), then the one or more IO lines 180 may be driven by the target device 120 (e.g., for in-band interrupt signaling). FIG. 5 depicts a communication interface 130 that includes four IO lines 180 as an example (e.g., for a quad SPI configuration). However, in other aspects, the communication interface may include a different quantity of IO lines 180, such as two IO lines, one IO line, or another quantity of IO lines.

In some aspects, the multiple IO lines 180 may be collectively used (e.g., by the target device) to indicate a bit-mapped number. For example, each IO line may be mapped to a different bit of the bit-mapped number. For example, the IO line 505 may be mapped to a first bit of the bit-mapped number, the IO line 510 may be mapped to a second bit of the bit-mapped number, the IO line 515 may be mapped to a third bit of the bit-mapped number, and the IO line 520 may be mapped to a fourth bit of the bit-mapped number. Different values that are capable of being indicated by the bit-mapped number may be mapped to respective interrupt channels and/or functions of the target device 120. For example, if there are four IO channels 180, then the bit-mapped number may include four bits. In such examples, the four-bit bit-mapped number may be capable of conveying 16 different values. A single value may be mapped to an indication that the interrupt signal is not asserted and the remaining values (e.g., 15 values) may be mapped to respective interrupt channels and/or functions of the target device 120. If the bit-mapped number indicates a value mapped to a given interrupt channel and/or function, then the main device 110 may determine that an interrupt signal is asserted for that given interrupt channel and/or function.

For example, as shown in FIG. 5, the target device 120 may transmit an interrupt signal 525 via the multiple IO lines. For example, the target device 120 may drive each IO line to different levels (e.g., to different logic levels) to indicate a given bit-mapped number via the multiple IO lines. For example, the bit-mapped number indicated by the interrupt signal 525 may be "0010" because the IO line 505 is driven to a low value (e.g., a logic 0), the IO line 510 is driven to a low value (e.g., a logic 0), the IO line 515 is driven to a high value (e.g., a logic 1), and the IO line 520 is driven to a low value (e.g., a logic 0). The bit-mapped number (e.g., "0010") may be mapped to an interrupt channel and/or a function. Therefore, the interrupt signal 525 may indicate to the main device 110 that an interrupt is asserted for the interrupt channel and/or the function.

By using the multiple IO lines to indicate a bit-mapped number, the quantity of interrupt channels that can be supported by the target device 120 may be increased. For example, in configurations where the communication interface 130 includes four IO lines, the target device 120 may support signaling interrupt signals for up to 15 different interrupt channels and/or functions.

As indicated above, FIG. 5 is provided as an example. Other examples may differ from what is described with respect to FIG. 5.

FIG. 6 is a flowchart of an example process 600 associated with an in-band interrupt signal for a communication interface, in accordance with the present disclosure. In some aspects, one or more process blocks of FIG. 6 are performed by a system (e.g., the system 100). In some aspects, one or more process blocks of FIG. 6 are performed by another device or a group of devices separate from or including the system, such as the main device 110 and/or the target device 120. Additionally, or alternatively, one or more process blocks of FIG. 6 may be performed by one or more components of the system 100, such as the one or more controllers 140, the one or more controllers 150, the communication interface 130, and/or another component.

As shown in FIG. 6, process 600 may include transmitting a first value of a chip select signal indicating chip select de-assertion (block 610). For example, the system may transmit a first value of a chip select signal indicating chip select de-assertion, as described above.

As further shown in FIG. 6, process 600 may include transmitting an interrupt signal while the chip select line indicates the first value (block 620). For example, the system may transmit an interrupt signal while the chip select line indicates the first value, as described above.

As further shown in FIG. 6, process 600 may include transmitting, via the chip select line, a second value of the chip select signal indicating chip select assertion (block 630). For example, the system may transmit, via the chip select line, a second value of the chip select signal indicating chip select assertion, as described above.

As further shown in FIG. 6, process 600 may include performing, via at least one of the one or more data lines, one or more data operations based on the target device transmitting the interrupt signal (block 640). For example, the system may perform, via at least one of the one or more data lines, one or more data operations based on the target device transmitting the interrupt signal, as described above.

Process 600 may include additional aspects, such as any single aspect or any combination of aspects described below and/or in connection with one or more other processes described elsewhere herein.

In a first aspect, process 600 includes refraining, by the target device and based on the main device transmitting the second value of the chip select signal, from transmitting using the one or more data lines within a clock activation delay time period after the chip select line indicates the second value of the chip select signal indicating chip select assertion.

In a second aspect, alone or in combination with the first aspect, the clock activation delay time period is based on a turn-around time for the one or more data lines and an interrupt de-assertion time of the target device.

In a third aspect, alone or in combination with one or more of the first and second aspects, transmitting the first value of the chip select signal indicating chip select de-assertion includes transmitting, via the chip select line, the first value for at least a de-assertion time period.

In a fourth aspect, alone or in combination with one or more of the first through third aspects, process 600 includes refraining, by the main device, from transmitting using the one or more data lines within a period of time after the chip select line indicates the first value of the chip select signal indicating chip select de-assertion.

In a fifth aspect, alone or in combination with one or more of the first through fourth aspects, transmitting the interrupt signal includes transmitting the interrupt signal after the period of time.

In a sixth aspect, alone or in combination with one or more of the first through fifth aspects, the one or more data lines include multiple data lines, wherein the multiple data lines are associated with respective interrupt lines of multiple interrupt lines for the target device, and wherein the multiple interrupt lines are associated with respective channels or respective functions of the target device.

In a seventh aspect, alone or in combination with one or more of the first through sixth aspects, the interrupt signal is a level-triggered interrupt signal.

In an eighth aspect, alone or in combination with one or more of the first through seventh aspects, process 600 includes refraining, by the target device while the chip select line indicates the second value, from transmitting using the one or more data lines, transmitting, by the main device and via the chip select line, the first value of the chip select signal indicating the chip select de-assertion, and transmitting, by the target device and while the chip select line indicates the first value, a re-assertion of the interrupt signal via the one or more data lines.

In a ninth aspect, alone or in combination with one or more of the first through eighth aspects, transmitting the second value of the chip select signal via the chip select line and transmitting the interrupt signal occur within a threshold amount of time from each other, and process 600 includes refraining from transmitting using the one or more data lines within a period of time after the chip select line indicates the second value.

In a tenth aspect, alone or in combination with one or more of the first through ninth aspects, process 600 includes transmitting, by the main device and via the chip select line, the first value of the chip select signal indicating the chip select de-assertion, and transmitting, by the target device and while the chip select line indicates the first value, a re-assertion of the interrupt signal via the one or more data lines.

In an eleventh aspect, alone or in combination with one or more of the first through tenth aspects, the one or more data lines include multiple data lines, and transmitting the interrupt signal includes transmitting multiple interrupt signals via respective data lines of the multiple data lines.

In a twelfth aspect, alone or in combination with one or more of the first through eleventh aspects, the one or more data lines include multiple data lines, wherein multiple bit values capable of being indicated via the multiple data lines are mapped to respective functions or channels of the target device, and wherein transmitting the interrupt signal includes transmitting a bit value, of the multiple bit values, via values of respective data lines of the multiple data lines.

In a thirteenth aspect, alone or in combination with one or more of the first through twelfth aspects, the interrupt signal is an asynchronous signal.

In a fourteenth aspect, alone or in combination with one or more of the first through thirteenth aspects, transmitting the interrupt signal includes transmitting the interrupt signal while a clock signal of the communication interface is not being toggled.

In a fifteenth aspect, alone or in combination with one or more of the first through fourteenth aspects, the communication interface is a one-to-one interface between the main device and the target device.

In a sixteenth aspect, alone or in combination with one or more of the first through fifteenth aspects, the communication interface is a serial peripheral interface.

In a seventeenth aspect, alone or in combination with one or more of the first through sixteenth aspects, the target device is an embedded controller.

Although FIG. 6 shows example blocks of process 600, in some aspects, process 600 includes additional blocks, fewer blocks, different blocks, or differently arranged blocks than those depicted in FIG. 6. Additionally, or alternatively, two or more of the blocks of process 600 may be performed in parallel.

FIG. 7 is a flowchart of an example process 700 associated with an in-band interrupt signal for a communication interface, in accordance with the present disclosure. In some aspects, one or more process blocks of FIG. 7 are performed by a main device (e.g., main device 110). In some aspects, one or more process blocks of FIG. 7 are performed by another device or a group of devices separate from or including the main device, such as the system 100 and/or the target device 120. Additionally, or alternatively, one or more process blocks of FIG. 6 may be performed by one or more components of the system 100, such as the one or more controllers 140, the one or more controllers 150, the communication interface 130, and/or another component.

As shown in FIG. 7, process 700 may include transmitting, to a target device and via a chip select line of a communication interface, a first value of a chip select signal indicating chip select de-assertion (block 710). For example, the main device may transmit, to a target device and via a chip select line of a communication interface, a first value of a chip select signal indicating chip select de-assertion, as described above.

As further shown in FIG. 7, process 700 may include receiving, from the target device and via one or more data lines of the communication interface, an interrupt signal while the chip select line indicates the first value (block 720). For example, the main device may receive, from the target device and via one or more data lines of the communication interface, an interrupt signal while the chip select line indicates the first value, as described above.

As further shown in FIG. 7, process 700 may include transmitting, to the target device and via the chip select line, a second value of the chip select signal indicating chip select assertion (block 730). For example, the main device may transmit, to the target device and via the chip select line, a second value of the chip select signal indicating chip select assertion, as described above.

As further shown in FIG. 7, process 700 may include performing, via at least one of the one or more data lines, one or more data operations based on receiving the interrupt signal (block 740). For example, the main device may perform, via at least one of the one or more data lines, one or more data operations based on receiving the interrupt signal, as described above.

Process 700 may include additional aspects, such as any single aspect or any combination of aspects described below and/or in connection with one or more other processes described elsewhere herein.

In a first aspect, transmitting the first value of the chip select signal indicating chip select de-assertion includes transmitting, via the chip select line, the first value for at least a de-assertion time period.

In a second aspect, alone or in combination with the first aspect, process 700 includes refraining from transmitting using the one or more data lines within a period of time after the chip select line indicates the first value of the chip select signal indicating chip select de-assertion.

In a third aspect, alone or in combination with one or more of the first and second aspects, receiving the interrupt signal includes receiving the interrupt signal after the period of time.

In a fourth aspect, alone or in combination with one or more of the first through third aspects, the one or more data lines include multiple data lines, wherein the multiple data lines are associated with respective interrupt lines of multiple interrupt lines for the target device, and wherein the multiple interrupt lines are associated with respective channels or respective functions of the target device.

In a fifth aspect, alone or in combination with one or more of the first through fourth aspects, the interrupt signal is a level-triggered interrupt signal.

In a sixth aspect, alone or in combination with one or more of the first through fifth aspects, process 700 includes transmitting, via the chip select line, the first value of the chip select signal indicating the chip select de-assertion, and receiving, from the target device and while the chip select line indicates the first value, a re-assertion of the interrupt signal via the one or more data lines.

In a seventh aspect, alone or in combination with one or more of the first through sixth aspects, the one or more data lines include multiple data lines, and receiving the interrupt signal includes receiving multiple interrupt signals via respective data lines of the multiple data lines.

In an eighth aspect, alone or in combination with one or more of the first through seventh aspects, the one or more data lines include multiple data lines, wherein multiple bit values capable of being indicated via the multiple data lines are mapped to respective functions or channels of the target device, and wherein receiving the interrupt signal includes receiving a bit value, of the multiple bit values, via values of respective data lines of the multiple data lines.

In a ninth aspect, alone or in combination with one or more of the first through eighth aspects, the interrupt signal is an asynchronous signal.

In a tenth aspect, alone or in combination with one or more of the first through ninth aspects, process 700 includes refraining from transmitting a clock signal via the communication interface while the chip select line indicates the first value, and receiving the interrupt signal includes receiving the interrupt signal while the clock signal is not being toggled.

In an eleventh aspect, alone or in combination with one or more of the first through tenth aspects, the communication interface is a one-to-one interface between the main device and the target device.

In a twelfth aspect, alone or in combination with one or more of the first through eleventh aspects, the communication interface is a serial peripheral interface.

In a thirteenth aspect, alone or in combination with one or more of the first through twelfth aspects, the target device is an embedded controller.

Although FIG. 7 shows example blocks of process 700, in some aspects, process 700 includes additional blocks, fewer blocks, different blocks, or differently arranged blocks than those depicted in FIG. 7. Additionally, or alternatively, two or more of the blocks of process 700 may be performed in parallel.

FIG. 8 is a flowchart of an example process 800 associated with an in-band interrupt signal for a communication interface, in accordance with the present disclosure. In some aspects, one or more process blocks of FIG. 8 are performed by a target device (e.g., target device 120). In some aspects, one or more process blocks of FIG. 8 are performed by another device or a group of devices separate from or including the target device, such as the system 100 and/or the main device 110. Additionally, or alternatively, one or more process blocks of FIG. 6 may be performed by one or more components of the system 100, such as the one or more controllers 140, the one or more controllers 150, the communication interface 130, and/or another component.

As shown in FIG. 8, process 800 may include receiving, from a main device via a chip select line of a communication interface, a first value of a chip select signal indicating chip select de-assertion (block 810). For example, the target device may receive, from a main device via a chip select line of a communication interface, a first value of a chip select signal indicating chip select de-assertion, as described above.

As further shown in FIG. 8, process 800 may include transmitting, to the main device via one or more data lines of the communication interface, an interrupt signal while the chip select line indicates the first value (block 820). For example, the target device may transmit, to the main device via one or more data lines of the communication interface, an interrupt signal while the chip select line indicates the first value, as described above.

As further shown in FIG. 8, process 800 may include receiving, from the main device and via the chip select line, a second value of the chip select signal indicating chip select assertion (block 830). For example, the target device may receive, from the main device and via the chip select line, a second value of the chip select signal indicating chip select assertion, as described above.

As further shown in FIG. 8, process 800 may include performing, via at least one of the one or more data lines, one or more data operations based on transmitting the interrupt signal (block 840). For example, the target device may perform, via at least one of the one or more data lines, one or more data operations based on transmitting the interrupt signal, as described above.

Process 800 may include additional aspects, such as any single aspect or any combination of aspects described below and/or in connection with one or more other processes described elsewhere herein.

In a first aspect, process 800 includes refraining, based on the main device transmitting the second value of the chip select signal, from transmitting using the one or more data lines within a clock activation delay time period after the chip select line indicates the second value of the chip select signal indicating chip select assertion.

In a second aspect, alone or in combination with the first aspect, the clock activation delay time period is based on a turn-around time for the one or more data lines and an interrupt de-assertion time of the target device.

In a third aspect, alone or in combination with one or more of the first and second aspects, receiving the first value of the chip select signal indicating chip select de-assertion includes receiving, via the chip select line, the first value for at least a de-assertion time period.

In a fourth aspect, alone or in combination with one or more of the first through third aspects, transmitting the interrupt signal includes transmitting the interrupt signal after a period of time after the chip select line indicates the first value of the chip select signal indicating chip select de-assertion.

In a fifth aspect, alone or in combination with one or more of the first through fourth aspects, the one or more data lines include multiple data lines, wherein the multiple data lines are associated with respective interrupt lines of multiple interrupt lines for the target device, and wherein the multiple interrupt lines are associated with respective channels or respective functions of the target device.

In a sixth aspect, alone or in combination with one or more of the first through fifth aspects, the interrupt signal is a level-triggered interrupt signal.

In a seventh aspect, alone or in combination with one or more of the first through sixth aspects, process 800 includes refraining, while the chip select line indicates the second value, from transmitting using the one or more data lines, receiving, from the main device and via the chip select line, the first value of the chip select signal indicating the chip select de-assertion, and transmitting, while the chip select line indicates the first value, a re-assertion of the interrupt signal via the one or more data lines.

In an eighth aspect, alone or in combination with one or more of the first through seventh aspects, receiving the second value of the chip select signal via the chip select line and transmitting the interrupt signal occur within a threshold amount of time from each other, and process 800 includes refraining from transmitting using the one or more data lines within a period of time after the chip select line indicates the second value.

In a ninth aspect, alone or in combination with one or more of the first through eighth aspects, process 800 includes receiving, from the main device and via the chip select line, the first value of the chip select signal indicating the chip select de-assertion, and transmitting, while the chip select line indicates the first value, a re-assertion of the interrupt signal via the one or more data lines.

In a tenth aspect, alone or in combination with one or more of the first through ninth aspects, the one or more data lines include multiple data lines, and transmitting the interrupt signal includes transmitting multiple interrupt signals via respective data lines of the multiple data lines.

In an eleventh aspect, alone or in combination with one or more of the first through tenth aspects, the one or more data lines include multiple data lines, wherein multiple bit values capable of being indicated via the multiple data lines are mapped to respective functions or channels of the target device, and wherein transmitting the interrupt signal includes transmitting a bit value, of the multiple bit values, via values of respective data lines of the multiple data lines.

In a twelfth aspect, alone or in combination with one or more of the first through eleventh aspects, the interrupt signal is an asynchronous signal.

In a thirteenth aspect, alone or in combination with one or more of the first through twelfth aspects, transmitting the interrupt signal includes transmitting the interrupt signal while a clock signal of the communication interface is not being toggled.

In a fourteenth aspect, alone or in combination with one or more of the first through thirteenth aspects, the communication interface is a one-to-one interface between the main device and the target device.

In a fifteenth aspect, alone or in combination with one or more of the first through fourteenth aspects, the communication interface is a serial peripheral interface.

In a sixteenth aspect, alone or in combination with one or more of the first through fifteenth aspects, the target device is an embedded controller.

Although FIG. 8 shows example blocks of process 800, in some aspects, process 800 includes additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method performed by a system, comprising: transmitting, by a main device of the system via a chip select line of a communication interface, a first value of a chip select signal indicating chip select de-assertion; transmitting, by a target device of the system via one or more data lines of the communication interface, an interrupt signal while the chip select line indicates the first value; transmitting, by the main device and via the chip select line, a second value of the chip select signal indicating chip select assertion; and performing, via at least one of the one or more data lines, one or more data operations based on the target device transmitting the interrupt signal.

Aspect 2: The method of Aspect 1, further comprising: refraining, by the target device and based on the main device transmitting the second value of the chip select signal, from transmitting using the one or more data lines within a clock activation delay time period after the chip select line indicates the second value of the chip select signal indicating chip select assertion.

Aspect 3: The method of Aspect 2, wherein the clock activation delay time period is based on a turn-around time for the one or more data lines and an interrupt de-assertion time of the target device.

Aspect 4: The method of any of Aspects 1-3, wherein transmitting the first value of the chip select signal indicating chip select de-assertion comprises: transmitting, by the main device and via the chip select line, the first value for at least a de-assertion time period.

Aspect 5: The method of any of Aspects 1-4, further comprising: refraining, by the main device, from transmitting using the one or more data lines within a period of time after the chip select line indicates the first value of the chip select signal indicating chip select de-assertion.

Aspect 6: The method of Aspect 5, wherein transmitting the interrupt signal comprises: transmitting, by the target device, the interrupt signal after the period of time.

Aspect 7: The method of any of Aspects 1-6, wherein the one or more data lines include multiple data lines, wherein the multiple data lines are associated with respective interrupt lines of multiple interrupt lines for the target device, and wherein the multiple interrupt lines are associated with respective channels or respective functions of the target device.

Aspect 8: The method of any of Aspects 1-7, wherein the interrupt signal is a level-triggered interrupt signal.

Aspect 9: The method of any of Aspects 1-8, further comprising: refraining, by the target device while the chip select line indicates the second value, from transmitting using the one or more data lines; transmitting, by the main device and via the chip select line, the first value of the chip select signal indicating the chip select de-assertion; and transmitting, by the target device and while the chip select line indicates the first value, a re-assertion of the interrupt signal via the one or more data lines.

Aspect 10: The method of any of Aspects 1-9, wherein transmitting the second value of the chip select signal via the chip select line and transmitting the interrupt signal occur within a threshold amount of time from each other, the method further comprising: refraining, by the target device, from transmitting using the one or more data lines within a period of time after the chip select line indicates the second value.

Aspect 11: The method of Aspect 10, further comprising: transmitting, by the main device and via the chip select line, the first value of the chip select signal indicating the chip select de-assertion; and transmitting, by the target device and while the chip select line indicates the first value, a re-assertion of the interrupt signal via the one or more data lines.

Aspect 12: The method of any of Aspects 1-11, wherein the one or more data lines include multiple data lines, and wherein transmitting the interrupt signal comprises: transmitting multiple interrupt signals via respective data lines of the multiple data lines.

Aspect 13: The method of any of Aspects 1-12, wherein the one or more data lines include multiple data lines, wherein multiple bit values capable of being indicated via the multiple data lines are mapped to respective functions or channels of the target device, and wherein transmitting the interrupt signal comprises: transmitting a bit value, of the multiple bit values, via values of respective data lines of the multiple data lines.

Aspect 14: The method of any of Aspects 1-13, wherein the interrupt signal is an asynchronous signal.

Aspect 15: The method of any of Aspects 1-14, wherein transmitting the interrupt signal comprises: transmitting the interrupt signal while a clock signal of the communication interface is not being toggled.

Aspect 16: The method of any of Aspects 1-15, wherein the communication interface is a one-to-one interface between the main device and the target device.

Aspect 17: The method of any of Aspects 1-16, wherein the communication interface is a serial peripheral interface.

Aspect 18: The method of any of Aspects 1-17, wherein the target device is an embedded controller.

Aspect 19: A method performed by a main device, comprising: transmitting, to a target device and via a chip select line of a communication interface, a first value of a chip select signal indicating chip select de-assertion; receiving, from the target device and via one or more data lines of the communication interface, an interrupt signal while the chip select line indicates the first value; transmitting, to the target device and via the chip select line, a second value of the chip select signal indicating chip select assertion; and performing, via at least one of the one or more data lines, one or more data operations based on receiving the interrupt signal.

Aspect 20: The method of Aspect 19, wherein transmitting the first value of the chip select signal indicating chip select de-assertion comprises: transmitting, via the chip select line, the first value for at least a de-assertion time period.

Aspect 21: The method of any of Aspects 19-20, further comprising: refraining from transmitting using the one or more data lines within a period of time after the chip select line indicates the first value of the chip select signal indicating chip select de-assertion.

Aspect 22: The method of Aspect 21, wherein receiving the interrupt signal comprises: receiving the interrupt signal after the period of time.

Aspect 23: The method of any of Aspects 19-22, wherein the one or more data lines include multiple data lines, wherein the multiple data lines are associated with respective interrupt lines of multiple interrupt lines for the target device, and wherein the multiple interrupt lines are associated with respective channels or respective functions of the target device.

Aspect 24: The method of any of Aspects 19-23, wherein the interrupt signal is a level-triggered interrupt signal.

Aspect 25: The method of any of Aspects 19-24, further comprising: transmitting, via the chip select line, the first value of the chip select signal indicating the chip select de-assertion; and receiving, from the target device and while the chip select line indicates the first value, a re-assertion of the interrupt signal via the one or more data lines.

Aspect 26: The method of any of Aspects 19-25, wherein the one or more data lines include multiple data lines, and wherein receiving the interrupt signal comprises: receiving multiple interrupt signals via respective data lines of the multiple data lines.

Aspect 27: The method of any of Aspects 19-26, wherein the one or more data lines include multiple data lines, wherein multiple bit values capable of being indicated via the multiple data lines are mapped to respective functions or channels of the target device, and wherein receiving the interrupt signal comprises: receiving a bit value, of the multiple bit values, via values of respective data lines of the multiple data lines.

Aspect 28: The method of any of Aspects 19-27, wherein the interrupt signal is an asynchronous signal.

Aspect 29: The method of any of Aspects 19-28, further comprising: refraining from transmitting a clock signal via the communication interface while the chip select line indicates the first value, and wherein receiving the interrupt signal comprises: receiving the interrupt signal while the clock signal is not being toggled.

Aspect 30: The method of any of Aspects 19-29, wherein the communication interface is a one-to-one interface between the main device and the target device.

Aspect 31: The method of any of Aspects 19-30, wherein the communication interface is a serial peripheral interface.

Aspect 32: The method of any of Aspects 19-31, wherein the target device is an embedded controller.

Aspect 33: A method performed by a target device, comprising: receiving, from a main device via a chip select line of a communication interface, a first value of a chip select signal indicating chip select de-assertion; transmitting, to the main device via one or more data lines of the communication interface, an interrupt signal while the chip select line indicates the first value; receiving, from the main device and via the chip select line, a second value of the chip select signal indicating chip select assertion; and performing, via at least one of the one or more data lines, one or more data operations based on transmitting the interrupt signal.

Aspect 34: The method of Aspect 33, further comprising: refraining, based on the main device transmitting the second value of the chip select signal, from transmitting using the one or more data lines within a clock activation delay time period after the chip select line indicates the second value of the chip select signal indicating chip select assertion.

Aspect 35: The method of Aspect 34, wherein the clock activation delay time period is based on a turn-around time for the one or more data lines and an interrupt de-assertion time of the target device.

Aspect 36: The method of any of Aspects 33-35, wherein receiving the first value of the chip select signal indicating chip select de-assertion comprises: receiving, via the chip select line, the first value for at least a de-assertion time period.

Aspect 37: The method of any of Aspects 33-36, wherein transmitting the interrupt signal comprises: transmitting, by the target device, the interrupt signal after a period of time after the chip select line indicates the first value of the chip select signal indicating chip select de-assertion.

Aspect 38: The method of any of Aspects 33-37, wherein the one or more data lines include multiple data lines, wherein the multiple data lines are associated with respective interrupt lines of multiple interrupt lines for the target device, and wherein the multiple interrupt lines are associated with respective channels or respective functions of the target device.

Aspect 39: The method of any of Aspects 33-38, wherein the interrupt signal is a level-triggered interrupt signal.

Aspect 40: The method of any of Aspects 33-39, further comprising: refraining, while the chip select line indicates the second value, from transmitting using the one or more data lines; receiving, from the main device and via the chip select line, the first value of the chip select signal indicating the chip select de-assertion; and transmitting, while the chip select line indicates the first value, a re-assertion of the interrupt signal via the one or more data lines.

Aspect 41: The method of any of Aspects 33-40, wherein receiving the second value of the chip select signal via the chip select line and transmitting the interrupt signal occur within a threshold amount of time from each other, the method further comprising: refraining from transmitting using the one or more data lines within a period of time after the chip select line indicates the second value.

Aspect 42: The method of Aspect 41, further comprising: receiving, from the main device and via the chip select line, the first value of the chip select signal indicating the chip select de-assertion; and transmitting, while the chip select line indicates the first value, a re-assertion of the interrupt signal via the one or more data lines.

Aspect 43: The method of any of Aspects 33-42, wherein the one or more data lines include multiple data lines, and wherein transmitting the interrupt signal comprises: transmitting multiple interrupt signals via respective data lines of the multiple data lines.

Aspect 44: The method of any of Aspects 33-43, wherein the one or more data lines include multiple data lines, wherein multiple bit values capable of being indicated via the multiple data lines are mapped to respective functions or channels of the target device, and wherein transmitting the interrupt signal comprises: transmitting a bit value, of the multiple bit values, via values of respective data lines of the multiple data lines.

Aspect 45: The method of any of Aspects 33-44, wherein the interrupt signal is an asynchronous signal.

Aspect 46: The method of any of Aspects 33-45, wherein transmitting the interrupt signal comprises: transmitting the interrupt signal while a clock signal of the communication interface is not being toggled.

Aspect 47: The method of any of Aspects 33-46, wherein the communication interface is a one-to-one interface between the main device and the target device.

Aspect 48: The method of any of Aspects 33-47, wherein the communication interface is a serial peripheral interface.

Aspect 49: The method of any of Aspects 33-48, wherein the target device is an embedded controller.

Aspect 50: A system configured to perform one or more operations recited in one or more of Aspects 1-49.

Aspect 51: An apparatus comprising means for performing one or more operations recited in one or more of Aspects 1-49.

Aspect 52: A non-transitory computer-readable medium storing a set of instructions, the set of instructions comprising one or more instructions that, when executed by a device, cause the device to perform one or more operations recited in one or more of Aspects 1-49.

Aspect 53: A computer program product comprising instructions or code for executing one or more operations recited in one or more of Aspects 1-49.

Aspect 54: A device comprising one or more memories, and one or more processors coupled to the one or more memories, the one or more processors configured to perform one or more operations recited in one or more of Aspects 1-49.

Aspect 55: A device comprising a processing system that includes one or more processors and one or more memories coupled with the one or more processors, the processing system configured to cause the device to perform the method of one or more of Aspects 1-49.

Aspect 56: A device comprising one or more controllers configured to perform one or more operations recited in one or more of Aspects 1-49.

Aspect 57: A system comprising one or more controllers configured to cause the device to perform one or more operations recited in one or more of Aspects 1-49.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
a main device;
a target device configured to communicate with the main device via a communication interface;
one or more controllers configured to:
transmit, by the main device and via a chip select line, a first value of a chip select signal indicating chip select de-assertion;
transmit, by the target device and via one or more data lines, an in-band interrupt signal while the chip select line indicates the first value, wherein the one or more data lines include multiple data lines, and wherein the in-band interrupt signal corresponds to a bit-mapped number indicated by driving each of the multiple data lines to the first value or a second value;
perform, via at least one of the one or more data lines, one or more data operations based on the target device transmitting the in-band interrupt signal; and
transmit, by the main device and via the chip select line, the second value of the chip select signal indicating chip select assertion.

2. The system of claim 1,
wherein the one or more controllers, to transmit the first value of the chip select signal indicating chip select de-assertion, are configured to:
transmit, via the chip select line, the first value for at least a de-assertion time period.

3. The system of claim 1,
wherein the one or more controllers are further configured to:
refrain, by the main device, from transmitting using the one or more data lines within a period of time after the chip select line indicates the first value.

4. The system of claim 3,
wherein the one or more controllers, to transmit the in-band interrupt signal, are configured to:
transmit, by the target device, the in-band interrupt signal after the period of time.

5. The system of claim 1,
wherein the multiple data lines are associated with respective interrupt lines of multiple interrupt lines for the target device, and
wherein the multiple interrupt lines are associated with respective channels or respective functions of the target device.

6. The system of claim 1,
wherein the in-band interrupt signal is a level-triggered interrupt signal.

7. A main device, comprising:
one or more controllers configured to:
transmit, to a target device and via a chip select line of a communication interface, a first value of a chip select signal indicating chip select de-assertion;
receive, from the target device and via one or more data lines of the communication interface, an in-band interrupt signal while the chip select line indicates the first value, wherein the one or more data lines include multiple data lines, and wherein the in-band interrupt signal corresponds to a bit-mapped number indicated by driving each of the multiple data lines to the first value or a second value;
perform, via at least one of the one or more data lines, one or more data operations based on receiving the in-band interrupt signal; and
transmit, to the target device and via the chip select line, the second value of the chip select signal indicating chip select assertion.

8. The main device of claim 7,
wherein the one or more controllers, to transmit the first value of the chip select signal indicating chip select de-assertion, are configured to:
transmit, via the chip select line, the first value for at least a de-assertion time period.

9. The main device of claim 7,
wherein the one or more controllers are further configured to:
refrain from transmitting using the one or more data lines within a period of time after the chip select line indicates the first value of the chip select signal indicating chip select de-assertion.

10. The main device of claim 9,
wherein the one or more controllers, to receive the in-band interrupt signal, are configured to:
receive the in-band interrupt signal after the period of time.

11. The main device of claim 7,
wherein the multiple data lines are associated with respective interrupt lines of multiple interrupt lines for the target device, and
wherein the multiple interrupt lines are associated with respective channels or respective functions of the target device.

12. The main device of claim 7,
wherein the one or more controllers are further configured
    to:
    transmit, via the chip select line, the first value of the
        chip select signal indicating the chip select de-
        assertion; and
    receive, from the target device and while the chip select
        line indicates the first value, a re-assertion of the
        in-band interrupt signal via the one or more data
        lines.
13. The main device of claim 7,
wherein the one or more data lines include multiple data
    lines, and wherein the one or more controllers, to
    receive the in-band interrupt signal, are configured to:
    receive multiple in-band interrupt signals via respective
        data lines of the multiple data lines.
14. The main device of claim 7,
wherein the one or more data lines include multiple data
    lines, wherein multiple bit-mapped numbers capable of
    being indicated via the multiple data lines are mapped
    to respective functions or channels of the target device,
    and wherein the one or more controllers, to receive the
    in-band interrupt signal, are configured to:
    receive the bit-mapped number, of the multiple bit-
        mapped numbers, via values of respective data lines
        of the multiple data lines.
15. The main device of claim 7,
wherein the in-band interrupt signal is an asynchronous
    signal.
16. The main device of claim 7,
wherein the one or more controllers are further configured
    to:
    refrain from transmitting a clock signal via the com-
        munication interface while the chip select line indi-
        cates the first value, and wherein the one or more
        controllers, to receive the in-band interrupt signal,
        are configured to:
        receive the in-band interrupt signal while the clock
            signal is not being toggled.
17. A target device, comprising:
one or more controllers configured to:
    receive, from a main device via a chip select line of a
        communication interface, a first value of a chip
        select signal indicating chip select de-assertion;
    transmit, to the main device via one or more data lines
        of the communication interface, an in-band interrupt
        signal while the chip select line indicates the first
        value, wherein the one or more data lines include
        multiple data lines, and wherein the in-band interrupt
        signal corresponds to a bit-mapped number indicated
        by driving each of the multiple data lines to the first
        value or a second value;
    perform, via at least one of the one or more data lines,
        one or more data operations based on transmitting
        the in-band interrupt signal; and
    receive, from the main device and via the chip select
        line, the second value of the chip select signal
        indicating chip select assertion.
18. The target device of claim 17,
wherein the one or more controllers are further configured
    to:
    refrain, based on the main device transmitting the
        second value of the chip select signal, from trans-
        mitting using the one or more data lines within a
        clock activation delay time period after the chip
        select line indicates the second value of the chip
        select signal indicating chip select assertion.

19. The target device of claim 18,
wherein the clock activation delay time period is based on
    a turn-around time for the one or more data lines and an
    interrupt de-assertion time of the target device.
20. The target device of claim 17,
wherein the one or more controllers, to receive the first
    value of the chip select signal indicating chip select
    de-assertion, are configured to:
    receive, via the chip select line, the first value for at
        least a de-assertion time period.
21. The target device of claim 17,
wherein the one or more controllers, to transmit the
    in-band interrupt signal, are configured to:
    transmit the in-band interrupt signal after a period of
        time after the chip select line indicates the first value
        of the chip select signal indicating chip select de-
        assertion.
22. The target device of claim 17,
wherein the multiple data lines are associated with respec-
    tive interrupt lines of multiple interrupt lines for the
    target device, and
wherein the multiple interrupt lines are associated with
    respective channels or respective functions of the target
    device.
23. The target device of claim 17,
wherein the in-band interrupt signal is a level-triggered
    interrupt signal.
24. The target device of claim 17,
wherein the one or more controllers are further configured
    to:
    refrain, while the chip select line indicates the second
        value, from transmitting using the one or more data
        lines;
    receive, from the main device and via the chip select
        line, the first value of the chip select signal indicating
        the chip select de-assertion; and
    transmit, while the chip select line indicates the first
        value, a re-assertion of the in-band interrupt signal
        via the one or more data lines.
25. The target device of claim 17,
wherein the one or more data lines include multiple data
    lines, and wherein the one or more controllers, to
    transmit the in-band interrupt signal, are configured to:
    transmit multiple in-band interrupt signals via respec-
        tive data lines of the multiple data lines.
26. The target device of claim 17,
wherein the one or more data lines include multiple data
    lines, wherein multiple bit-mapped numbers capable of
    being indicated via the multiple data lines are mapped
    to respective functions or channels of the target device,
    and wherein the one or more controllers, to transmit the
    in-band interrupt signal, are configured to:
    transmit the bit-mapped number, of the multiple bit-
        mapped numbers, via values of respective data lines
        of the multiple data lines.
27. A method performed by a target device, comprising:
receiving, from a main device via a chip select line of a
    communication interface, a first value of a chip select
    signal indicating chip select de-assertion;
transmitting, to the main device via one or more data lines
    of the communication interface, an in-band interrupt
    signal while the chip select line indicates the first value,
    wherein the one or more data lines include multiple
    data lines, and wherein the in-band interrupt signal
    corresponds to a bit-mapped number indicated by driv-
    ing each of the multiple data lines to the first value or
    a second value;

performing, via at least one of the one or more data lines, one or more data operations based on transmitting the in-band interrupt signal; and receiving, from the main device and via the chip select line, the second value of the chip select signal indicating chip select assertion.

28. The method of claim 27, further comprising:

refraining, based on the main device transmitting the second value of the chip select signal, from transmitting using the one or more data lines within a clock activation delay time period after the chip select line indicates the second value of the chip select signal indicating chip select assertion.

29. The method of claim 27, wherein receiving the first value of the chip select signal indicating chip select de-assertion comprises:

receiving, via the chip select line, the first value for at least a de-assertion time period.

30. The method of claim 27, wherein the multiple data lines are associated with respective interrupt lines of multiple interrupt lines for the target device, and wherein the multiple interrupt lines are associated with respective channels or respective functions of the target device.

* * * * *